United States Patent
Pan

(10) Patent No.: US 12,250,744 B2
(45) Date of Patent: Mar. 11, 2025

(54) METHOD AND APPARATUS FOR SUPPORTING UE-TO-NETWORK RELAY COMMUNICATION IN A WIRELESS COMMUNICATION SYSTEM

(71) Applicant: ASUS Technology Licensing Inc., Taipei (TW)

(72) Inventor: Li-Te Pan, Taipei (TW)

(73) Assignee: ASUS Technology Licensing Inc., Taipei (TW)

( * ) Notice: Subject to any disclaimer, the term of this patent is extended or adjusted under 35 U.S.C. 154(b) by 0 days.

(21) Appl. No.: 17/988,269

(22) Filed: Nov. 16, 2022

(65) Prior Publication Data
US 2024/0049325 A1    Feb. 8, 2024

Related U.S. Application Data

(60) Provisional application No. 63/389,118, filed on Jul. 14, 2022.

(51) Int. Cl.
*H04W 76/19* (2018.01)
*H04W 76/25* (2018.01)
*H04W 88/04* (2009.01)

(52) U.S. Cl.
CPC ........... *H04W 76/19* (2018.02); *H04W 76/25* (2018.02); *H04W 88/04* (2013.01)

(58) Field of Classification Search
CPC ...... H04W 76/19; H04W 76/25; H04W 88/04
See application file for complete search history.

(56) References Cited

U.S. PATENT DOCUMENTS

| | | | |
|---|---|---|---|
| 2017/0142741 A1* | 5/2017 | Kaur | H04W 72/02 |
| 2021/0051758 A1* | 2/2021 | Xu | H04W 76/27 |
| 2021/0250749 A1* | 8/2021 | Cheng | H04W 8/005 |
| 2021/0385714 A1* | 12/2021 | Paladugu | H04W 36/30 |
| 2022/0272667 A1* | 8/2022 | Chen | H04W 72/30 |
| 2023/0022611 A1* | 1/2023 | Fujishiro | H04W 76/19 |
| 2023/0077496 A1* | 3/2023 | Cheng | H04W 76/19 370/328 |
| 2023/0269809 A1* | 8/2023 | Cheng | H04W 76/19 370/216 |
| 2024/0049327 A1* | 2/2024 | Cai | H04W 40/34 |
| 2024/0259906 A1* | 8/2024 | Freda | H04W 36/305 |

FOREIGN PATENT DOCUMENTS

| | | | | |
|---|---|---|---|---|
| CN | 114599121 A | * | 6/2022 | |
| WO | WO-2014117854 A1 | * | 8/2014 | ........ H04W 72/1268 |
| WO | WO-2022036501 A1 | * | 2/2022 | |
| WO | WO-2022074126 A1 | * | 4/2022 | |

* cited by examiner

*Primary Examiner* — Jamaal Henson
(74) *Attorney, Agent, or Firm* — Skaar Ulbrich Macari, P.A.

(57) ABSTRACT

A method and device are disclosed from the perspective of a remote User Equipment (UE). In one embodiment, the method includes the remote UE establishing a layer-2 link with a relay UE. The method further includes the remote UE establishing a Radio Resource Control (RRC) connection with a network via the relay UE. The method also includes the remote UE initiating or performing a RRC connection re-establishment procedure, wherein the remote UE determines to keep the layer-2 link with the relay UE in the RRC connection re-establishment procedure. In addition, the method includes the remote UE starting a timer T301 in response to keeping the layer-2 link with the relay UE.

12 Claims, 11 Drawing Sheets

METHOD AND APPARATUS FOR SUPPORTING UE-TO-NETWORK RELAY COMMUNICATION IN A WIRELESS COMMUNICATION SYSTEM

CROSS-REFERENCE TO RELATED APPLICATIONS

The present Application claims the benefit of U.S. Provisional Patent Application Ser. No. 63/389,118 filed on Jul. 14, 2022, the entire disclosure of which is incorporated herein in its entirety by reference.

FIELD

This disclosure generally relates to wireless communication networks, and more particularly, to a method and apparatus for supporting UE-to-network relay communication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed from the perspective of a remote User Equipment (UE). In one embodiment, the method includes the remote UE establishing a layer-2 link with a relay UE. The method further includes the remote UE establishing a Radio Resource Control (RRC) connection with a network via the relay UE. The method also includes the remote UE initiating or performing a RRC connection re-establishment procedure, wherein the remote UE determines to keep the layer-2 link with the relay UE in the RRC connection re-establishment procedure. In addition, the method includes the remote UE starting a timer T301 in response to keeping the layer-2 link with the relay UE.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 23.304 V17.0.0, "Proximity based Services (ProSe) in the 5G System (5GS) (Release 17)"; TS 38.331 V17.0.0 (2022-03), "NR; Radio Resource Control (RRC) protocol specification (Release 17)"; and Draft TS 38.331 V17.1.0 (2022-06) ("Draft_38331-h10_v2.docx"), "NR; Radio Resource Control (RRC) protocol specification (Release 17)". The standards and documents listed above are hereby expressly incorporated by reference in their entirety.

Figure 1:
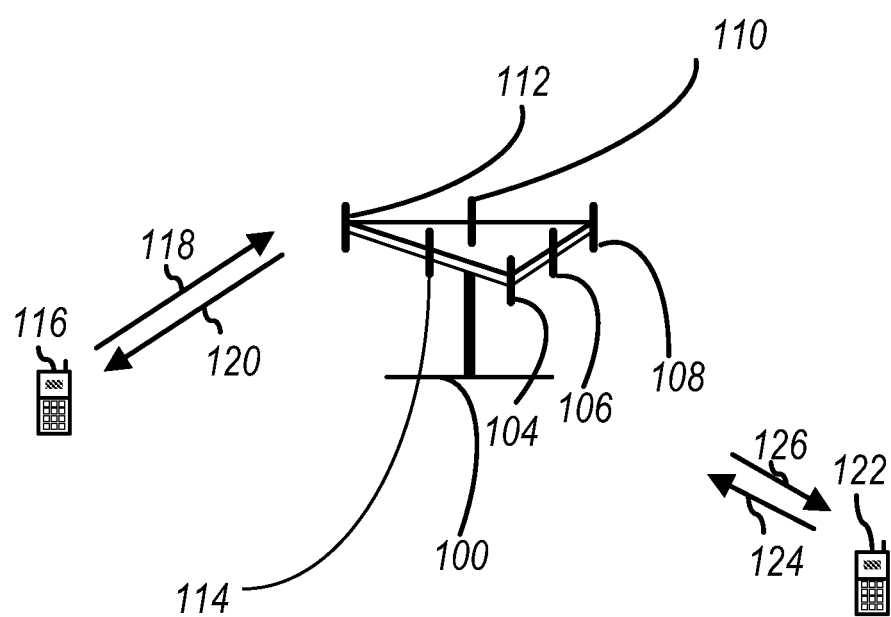
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
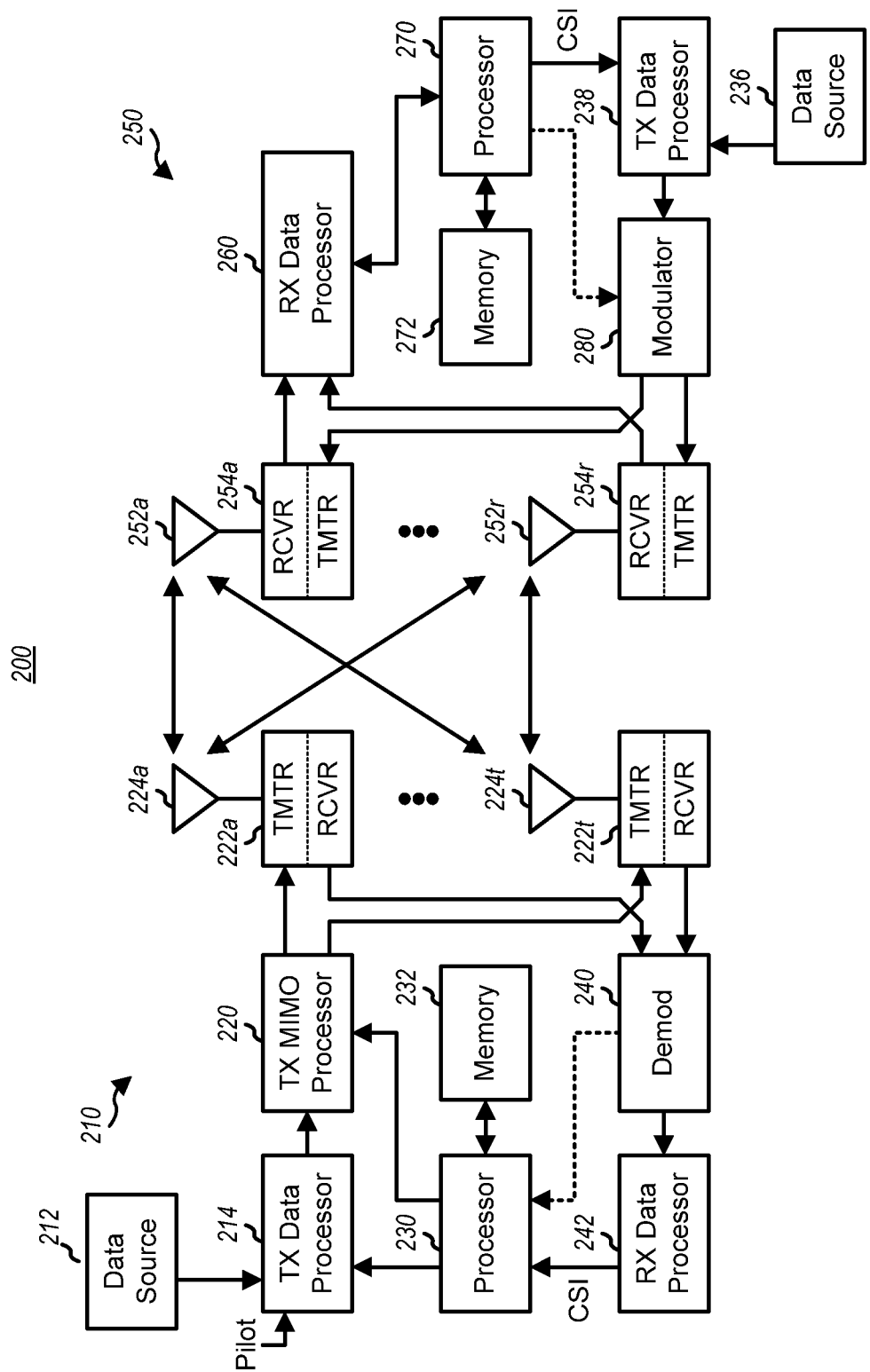
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by N R antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the N R received symbol streams from N R receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
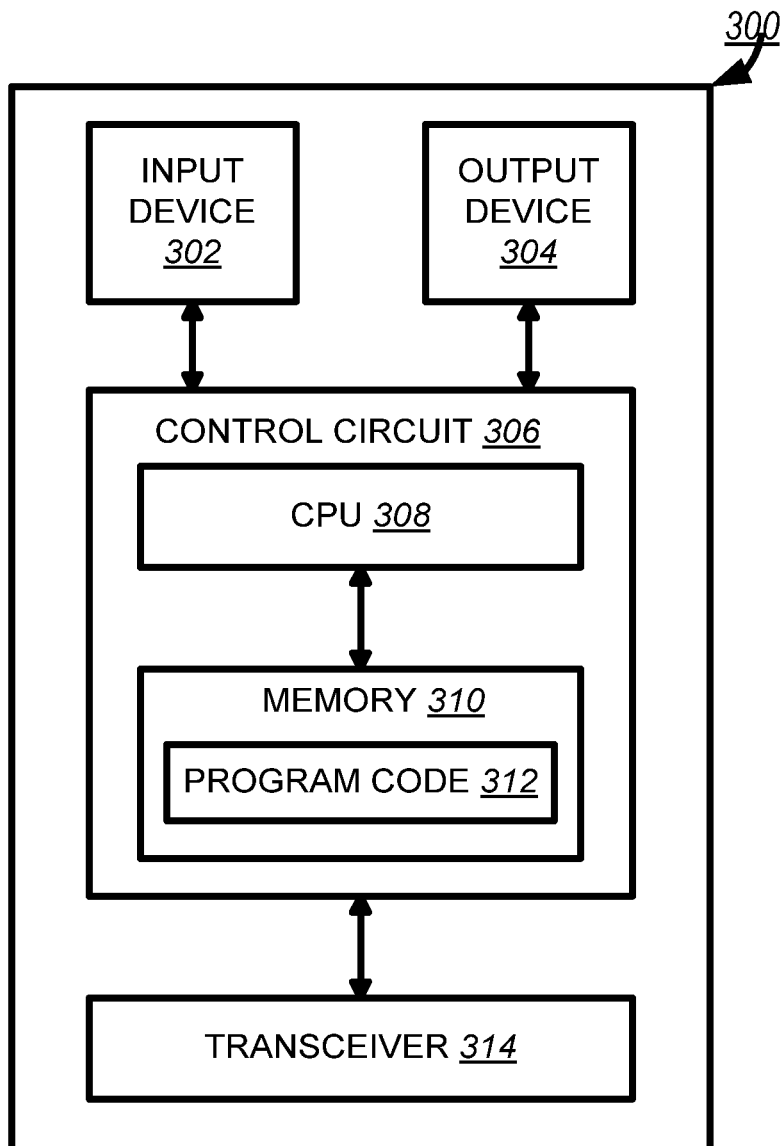
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
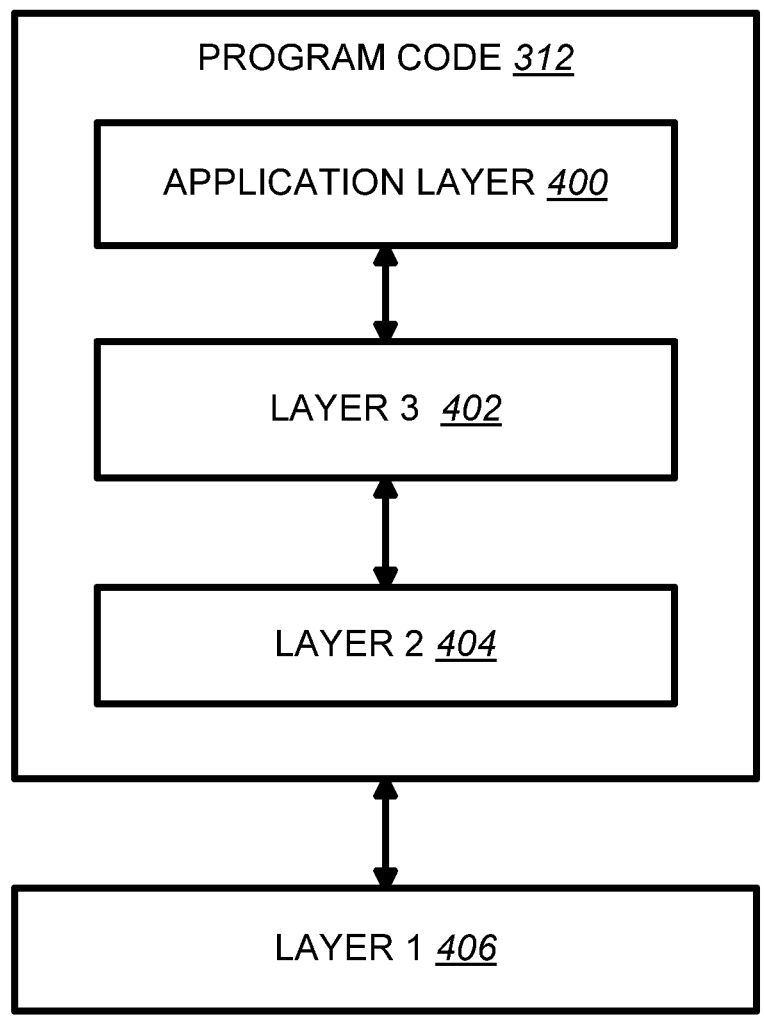
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 23.304 introduced the following:

4.3.9 5G ProSe UE-to-Network Relay 4.3.9.1 General

Both 5G ProSe Layer-2 and Layer-3 UE-to-Network Relay entity provides the relaying functionality to support connectivity to the network for 5G ProSe Remote UEs. It can be used for both public safety services and commercial services (e.g. interactive service).

Both 5G ProSe Layer-2 and Layer-3 UE-to-Network Relay supports the following functions to enable connectivity to the network:

- 5G ProSe UE-to-Network Relay Discovery service as defined in clause 6.3.2.3, to allow discovery by the 5G ProSe Remote UE;
- access the 5GS as a UE as defined in TS 23.501 [4] with the enhancements as specified in clauses 6.2 and 6.6;
- relays unicast traffic (uplink and downlink) between the 5G ProSe Remote UE and the network, supporting IP, Ethernet or Unstructured traffic type.
- NOTE: Relaying MBS traffic to a 5G ProSe Remote UE by a 5G ProSe UE-to-Network Relay is not supported in this release of the specification.

[ . . . ]

4.2.7.2 5G ProSe Layer-2 UE-to-Network Relay Reference Architecture

Figure 4.2.7.2-1 show the 5G ProSe Layer-2 UE-to-Network Relay reference architecture. The 5G ProSe Layer-2 Remote UE and 5G ProSe Layer-2 UE-to-Network Relay may be served by the same or different PLMNs. If the serving PLMNs of the 5G ProSe Layer-2 Remote UE and the 5G ProSe Layer-2UE-to-Network Relay are different then NG-RAN is shared by the serving PLMNs, see the 5G MOCN architecture in clause 5.18 of TS 23.501 [4].

Figure 5:
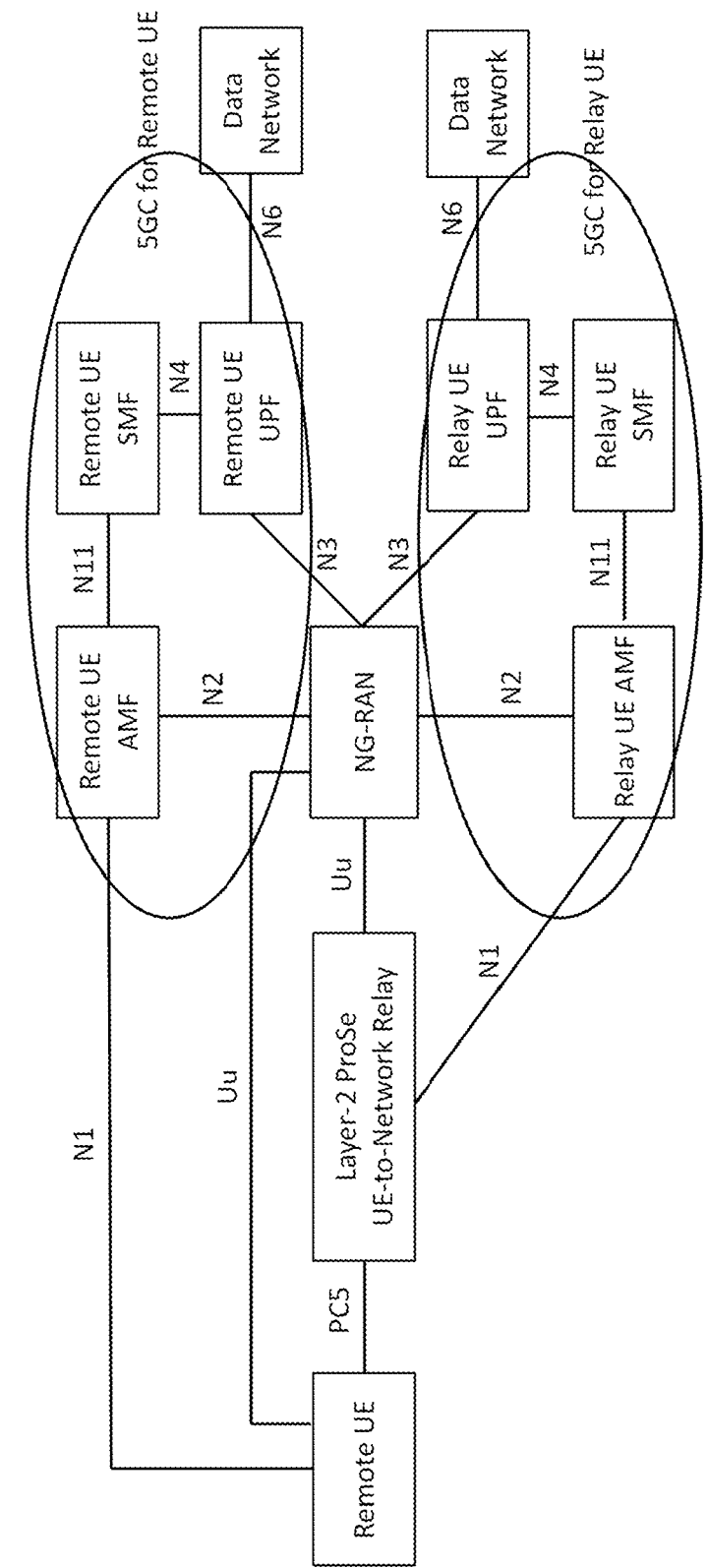
FIG. 5 is a reproduction of Figure 4.2.7.2-1 of 3GPP TS 23.304 V17.0.0.

Figure 4.2.7.2-1 of 3GPP TS 23.304 V17.0.0, Entitled "5G ProSe Layer-2 UE-to-Network Relay Reference Architecture", is Reproduced as FIG. 5

NOTE 1: Uu between the 5G ProSe Layer-2 Remote UE and NG-RAN consists of RRC, SDAP and PDCP.

NOTE 2: The 5G ProSe Layer-2 Remote UE and 5G ProSe Layer-2 UE-to-Network Relay are served by the same NG-RAN. The Core Network entities (e.g., AMF, SMF, UPF) serving the 5G ProSe Layer-2 Remote UE and the 5G ProSe Layer-2 UE-to-Network Relay can be the same or different.

[ . . . ]

6.1.1.7.2 5G ProSe Layer-2 UE-to-Network Relay

The UE-UE protocol stacks for discovery and PC5 signalling defined in clause 6.1.1.2 apply to 5G ProSe Remote UE and 5G ProSe Layer-2 UE-to-Network Relay.

Figure 6:
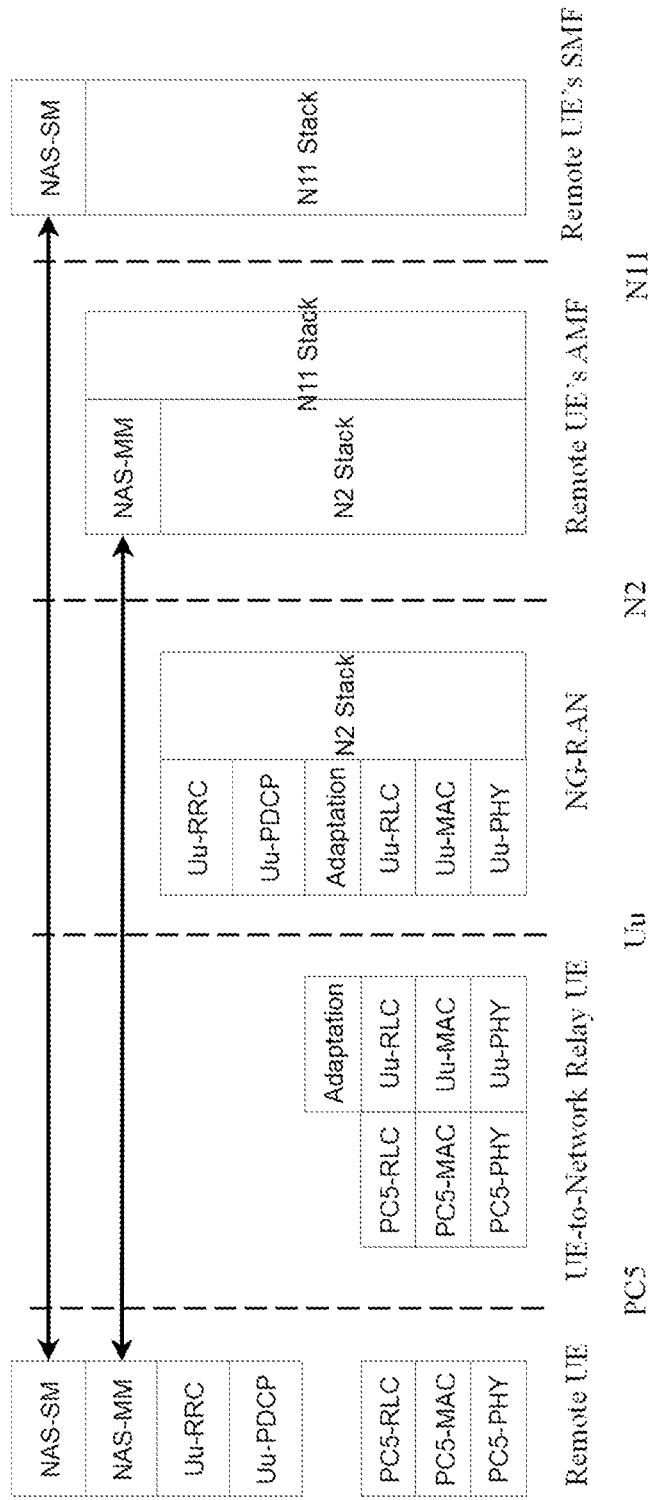
FIG. 6 is a reproduction of Figure 6.1.1.7.2-1 of 3GPP TS 23.304 V17.0.0.

Figure 6.1.1.7.2-1 illustrates the protocol stack of the NAS connection for the 5G ProSe Layer-2 Remote UE for NAS-MM and NAS-SM. The NAS messages are transparently transferred between the 5G ProSe Layer-2 Remote UE and NG-RAN over the 5G ProSe Layer-2 UE-to-Network Relay using:

- PDCP end-to-end connection between the 5G ProSe Layer-2 Remote UE and NG-RAN, where the role of the 5G ProSe Layer-2 UE-to-Network Relay is to relay the PDUs over the signalling radio bear without any modifications and using the functionality of the adaptation layer as specified in TS 38.351 [28].
- Connection between NG-RAN and AMF over N2.
- Connection between AMF and SMF over N11.

Editor's note: Whether the adaptation layer is supported over PC5 will be determined by RAN WG2.

Figure 6.1.1.7.2-1 of 3GPP TS 23.304 V17.0.0, Entitled "End-to-End Control Plane for a Remote UE Using Layer-2 UE-to-Network Relay", is Reproduced as FIG. 6

The control plane protocol stack used by the 5G ProSe Layer-2 UE-to-Network Relay is defined in clause 8.2.2 of TS 23.501 [4].

[ . . . ]

6.1.2.3.2 5G ProSe Layer-2 UE-to-Network Relay

Figure 6.1.2.2.2-1 illustrates the protocol stack for the user plane transport, related to a PDU Session, including a 5G ProSe Layer 2 UE-to-Network Relay. The PDU layer corresponds to the PDU carried between the 5G ProSe Layer-2 Remote UE and the Data Network (DN) over the PDU session. The SDAP and PDCP protocols are specified in TS 38.300 [12]. PDCP end-to-end connection is between the 5G ProSe Layer-2 Remote UE and NG-RAN. The functionality of the adaptation layer is specified in TS 38.351 [28].

Editor's note: Whether the adaptation layer is supported over PC5 will be determined by RAN WG2.

Figure 7:
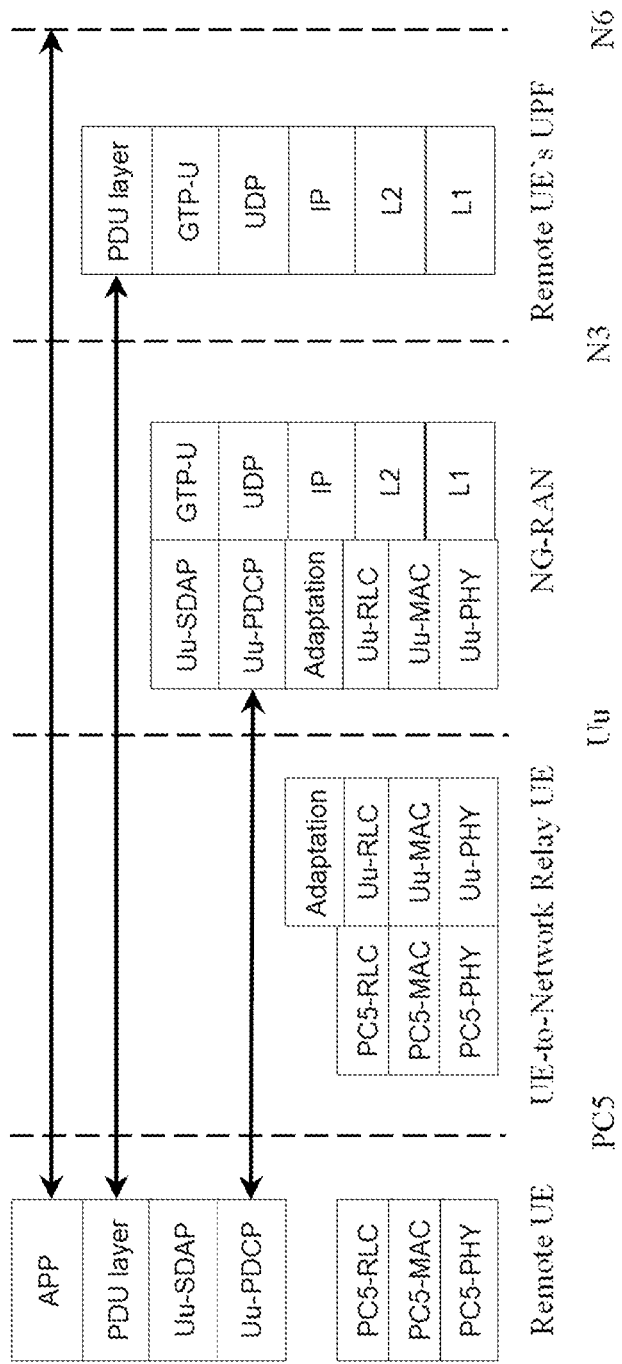
FIG. 7 is a reproduction of Figure 6.1.2.3.2-1 of 3GPP TS 23.304 V17.0.0.

Figure 6.1.2.3.2-1 of 3GPP TS 23.304 V17.0.0, Entitled "End-to-End User Plane Stack for a 5G ProSe Remote UE Using 5G ProSe Layer-2 UE-to-Network Relay", is Reproduced as FIG. 7

[ . . . ]

6.4 5G ProSe Direct Communication

[ . . . ]

6.4.3 Unicast mode 5G ProSe Direct Communication 6.4.3.1 Layer-2 Link Establishment Over PC5 Reference Point To perform unicast mode of ProSe Direct communication over PC5 reference point, the UE is configured with the related information as described in clause 5.1.3.

Figure 6.4.3.1-1 shows the layer-2 link establishment procedure for the unicast mode of ProSe Direct communication over PC5 reference point.

Figure 8:
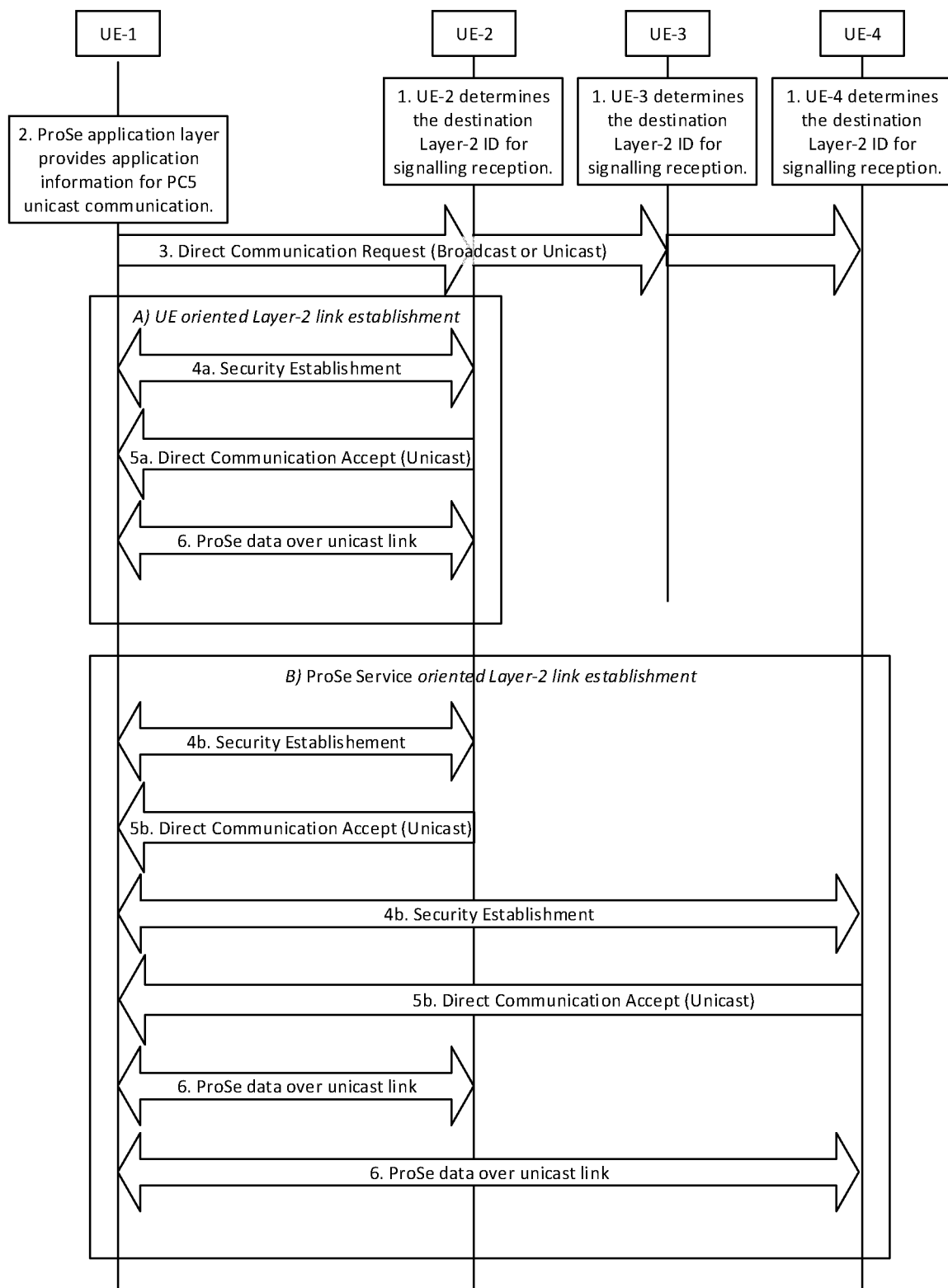
FIG. 8 is a reproduction of Figure 6.4.3.1-1 of 3GPP TS 23.304 V17.0.0.

Figure 6.4.3.1-1 of 3GPP TS 23.304 V17.0.0, Entitled "Layer-2 Link Establishment Procedure", is Reproduced as FIG. 8

1. The UE(s) determine the destination Layer-2 ID for signalling reception for PC5 unicast link establishment as specified in clause 5.8.2.4.
2. The ProSe application layer in UE-1 provides application information for PC5 unicast communication. The application information includes the ProSe Service Info, UE's Application Layer ID. The target UE's Application Layer ID may be included in the application information.

The ProSe application layer in UE-1 may provide ProSe Application Requirements for this unicast communication. UE-1 determines the PC5 QoS parameters and PFI as specified in clause 5.6.1.

If UE-1 decides to reuse the existing PC5 unicast link as specified in clause 5.3.4, the UE triggers the Layer-2 link modification procedure as specified in clause 6.4.3.4.

3. UE-1 sends a Direct Communication Request message to initiate the unicast layer-2 link establishment procedure. The Direct Communication Request message includes:

Source User Info: the initiating UE's Application Layer ID (i.e. UE-1's Application Layer ID).

If the ProSe application layer provided the target UE's Application Layer ID in step 2, the following information is included:

Target User Info: the target UE's Application Layer ID (i.e. UE-2's Application Layer ID).

ProSe Service Info: the information about the ProSe identifier(s) requesting Layer-2 link establishment.

Security Information: the information for the establishment of security.

NOTE 1: The Security Information and the necessary protection of the Source User Info and Target User Info are defined by SA WG3.

The source Layer-2 ID and destination Layer-2 ID used to send the Direct Communication Request message are determined as specified in clauses 5.8.2.1 and 5.8.2.4. The destination Layer-2 ID may be broadcast or unicast Layer-2 ID. When unicast Layer-2 ID is used, the Target User Info shall be included in the Direct Communication Request message.

UE-1 sends the Direct Communication Request message via PC5 broadcast or unicast using the source Layer-2 ID and the destination Layer-2 ID.

4. Security with UE-1 is established as below:

4a. If the Target User Info is included in the Direct Communication Request message, the target UE, i.e. UE-2, responds by establishing the security with UE-1.

4b. If the Target User Info is not included in the Direct Communication Request message, the UEs that are interested in using the announced ProSe Service(s) over a PC5 unicast link with UE-1 responds by establishing the security with UE-1.

NOTE 2: The signalling for the Security Procedure is defined by SA WG3.

When the security protection is enabled, UE-1 sends the following information to the target UE:

If IP communication is used:

IP Address Configuration: For IP communication, IP address configuration is required for this link and indicates one of the following values:

"DHCPv4 server" if only IPv4 address allocation mechanism is supported by the initiating UE, i.e., acting as a DHCPv4 server; or "IPv6 Router" if only IPv6 address allocation mechanism is supported by the initiating UE, i.e., acting as an IPv6 Router; or "DHCPv4 server & IPv6 Router" if both IPv4 and IPv6 address allocation mechanism are supported by the initiating UE; or "address allocation not supported" if neither IPv4 nor IPv6 address allocation mechanism is supported by the initiating UE.

Link-Local IPv6 Address: a link-local IPv6 address formed locally based on RFC 4862 if UE-1 does not support the IPv6 IP address allocation mechanism, i.e. the IP Address Configuration indicates "address allocation not supported".

QoS Info: the information about PC5 QoS Flow(s). For each PC5 QoS Flow, the PFI and the corresponding PC5 QoS parameters (i.e. PQI and conditionally other parameters such as MFBR/GFBR, etc.) and the associated ProSe identifier(s).

The source Layer-2 ID used for the security establishment procedure is determined as specified in clauses 5.8.2.1 and 5.8.2.4. The destination Layer-2 ID is set to the source Layer-2 ID of the received Direct Communication Request message.

Upon receiving the security establishment procedure messages, UE-1 obtains the peer UE's Layer-2 ID for future communication, for signalling and data traffic for this unicast link.

5. A Direct Communication Accept message is sent to UE-1 by the target UE(s) that has successfully established security with UE-1:

5a. (UE oriented Layer-2 link establishment) If the Target User Info is included in the Direct Communication Request message, the target UE, i.e. UE-2 responds with a Direct Communication Accept message if the Application Layer ID for UE-2 matches.

5b. (ProSe Service oriented Layer-2 link establishment) If the Target User Info is not included in the Direct Communication Request message, the UEs that are interested in using the announced ProSe Service(s) respond to the request by sending a Direct Communication Accept message (UE-2 and UE-4 in Figure 6.3.3.1-1).

The Direct Communication Accept message includes:

Source User Info: Application Layer ID of the UE sending the Direct Communication Accept message.

QoS Info: the information about PC5 QoS Flow(s). For each PC5 QoS Flow, the PFI and the corresponding PC5 QoS parameters requested by UE-1 (i.e. PQI and conditionally other parameters such as MFBR/GFBR, etc) and the associated ProSe identifiers(s).

If IP communication is used:

IP Address Configuration: For IP communication, IP address configuration is required for this link and indicates one of the following values:

"DHCPv4 server" if only IPv4 address allocation mechanism is supported by the target UE, i.e., acting as a DHCPv4 server; or "IPv6 Router" if only IPv6 address allocation mechanism is supported by the target UE, i.e., acting as an IPv6 Router; or "DHCPv4 server & IPv6 Router" if both IPv4 and IPv6 address allocation mechanism are supported by the target UE; or "address allocation not supported" if neither IPv4 nor IPv6 address allocation mechanism is supported by the target UE.

Link-Local IPv6 Address: a link-local IPv6 address formed locally based on RFC 4862 if the target UE does not support the IPv6 IP address allocation mechanism, i.e. the IP Address Configuration indicates "address allocation not supported", and UE-1 included a link-local IPv6 address in the Direct Communication Request message. The target UE shall include a non-conflicting link-local IPv6 address.

If both UEs (i.e. the initiating UE and the target UE) are selected to use link-local IPv6 address, they shall disable the duplicate address detection defined in RFC 4862 [17].

NOTE 3: When either the initiating UE or the target UE indicates the support of IPv6 routing, the corresponding address configuration procedure would be carried out after the establishment of the layer 2 link, and the link-local IPv6 addresses are ignored.

The ProSe layer of the UE that established PC5 unicast link passes the PC5 Link Identifier assigned for the unicast link and the PC5 unicast link related information down to the AS layer. The PC5 unicast link related information includes Layer-2 ID information (i.e. source Layer-2 ID and destination Layer-2 ID). This enables the AS layer to maintain the PC5 Link Identifier together with the PC5 unicast link related information.

6. ProSe data is transmitted over the established unicast link as below:

The PC5 Link Identifier and PFI are provided to the AS layer, together with the ProSe data.

Optionally in addition, the Layer-2 ID information (i.e. source Layer-2 ID and destination Layer-2 ID) is provided to the AS layer.

NOTE 4: It is up to UE implementation to provide the Layer-2 ID information to the AS layer.

UE-1 sends the ProSe data using the source Layer-2 ID (i.e. UE-1's Layer-2 ID for this unicast link) and the destination Layer-2 ID (i.e. the peer UE's Layer-2 ID for this unicast link).

NOTE 5: PC5 unicast link is bi-directional, therefore the peer UE of UE-1 can send the ProSe data to UE-1 over the unicast link with UE-1.

[ . . . ]

6.4.3.6 Layer-2 Link Management Over PC5 Reference Point for 5G ProSe UE-to-Network Relay The Layer-2 link procedures over PC5 reference point for unicast mode 5G ProSe Direct Communication as depicted from clause 6.4.3.1 to clause 6.4.3.5 can be used for the PC5 reference point between 5G ProSe Remote UE and 5G ProSe UE-to-Network Relay, with the following differences and clarifications:

The Layer-2 link modification procedure is applicable to ProSe Communication via 5G ProSe Layer-3 UE-to-Network Relay, other procedures are applicable to both ProSe Communication via 5G ProSe Layer-2 UE-to-Network Relay and ProSe Communication via 5G ProSe Layer-3 UE-to-Network Relay.

Editor's note: Whether the Layer-2 link modification procedure is also applicable to ProSe Communication via 5G ProSe Layer-2 UE-to-Network Relay requires cooperation with RAN2.

The UE oriented Layer-2 link establishment is used with UE-1 representing the 5G ProSe Remote UE and UE-2 representing the 5G ProSe UE-to-Network Relay. For other procedures either UE-1 represents the 5G ProSe Remote UE and UE-2 represents the 5G ProSe UE-to-Network Relay, or UE-1 represents the 5G ProSe UE-to-Network Relay and UE-2 represents the 5G ProSe Remote UE. I.e. the Layer-2 link establishment is initiated by the 5G ProSe Remote UE, while other procedures may be initiated either by the 5G ProSe Remote UE or by the 5G ProSe UE-to-Network Relay.

For the UE oriented Layer-2 link establishment as described in the clause 6.4.3.1, In step 1, the 5G ProSe Remote UE determines the destination Layer-2 ID for PC5 unicast link establishment based on the unicast source Layer-2 ID of the selected 5G ProSe UE-to-Network relay (as specified in clause 5.8.3) during UE-to-Network Relay discovery as specified in clause 6.3.2.3.

In step 2, 5G ProSe Remote UE (UE-1) determines the Relay Service Code to be used. The Relay Service Code to be used is selected from the received Relay Service Code(s) during UE-to-Network Relay discovery as specified in clause 6.3.2.3.

In step 3, 5G ProSe Remote UE (UE-1) sends a unicast Direct Communication Request message to the selected 5G ProSe UE-to-Network Relay. The destination Layer-2 ID used to send the Direct Communication Request message shall be unicast Layer-2 ID as determined in step 1. The Direct Communication Request message includes:

Source User Info: the identity of the Remote UE requesting relay operation.

Target User Info: the identity of the UE-to-Network Relay provided to the 5G ProSe Remote UE during UE-to-Network Relay Discovery procedure.

Relay Service Code: indicates the connectivity service provided by the 5G ProSe UE-to-Network Relay as requested by the 5G ProSe Remote UE.

Security Information: the information for the establishment of security.

In step 4 and step 5, step 4a and step 5a are performed if the 5G ProSe UE-to-Network Relay's identity matches the identity provided in the Target User Info and the Relay Service Code is one of the Relay Service Codes included during UE-to-Network Relay discovery as specified in clause 6.3.2.3. The Source User Info in the Direct Communication Accept message is the identity of the UE-to-Network Relay. In case of 5G ProSe Layer-2 UE-to-Network Relay, the Remote UE does not send the IP Address Configuration, Link-Local IPv6 Address and QoS Info to the 5G ProSe Layer-2 UE-to-Network Relay, and the Direct Communication Accept message does not include IP Address Configuration, Link-Local IPv6 Address and QoS Info. In case of 5G ProSe Layer-3 UE-to-Network Relay, the Direct Communication Accept message does not include the IP Address Configuration indicating the value "address allocation not supported".

In case of 5G ProSe Layer-2 UE-to-Network Relay, step 6 is not performed.

For the Layer-2 link release as described in the clause 6.4.3.3,

In step 1, if the Layer-2 link release procedure is initiated by the 5G ProSe UE-to-Network Relay, the Disconnect Request message may indicate the 5G ProSe UE-to-Network Relay is temporarily not available as described in clause 5.12.

NOTE: The form of the temporarily not available indication will be determined by stage 3.

If the service authorization for acting as a 5G ProSe Remote UE or as a 5G ProSe UE-to-Network Relay is revoked, the 5G ProSe UE-to-Network Relay should initiate the release of the layer-2 link that the revoked authorization affects.

For the Layer-2 link modification as described in the clause 6.4.3.4,

In step 1, the Layer-2 link modification procedure may be initiated by the 5G ProSe Layer-3 Remote UE based on the application information received from its ProSe application layer. The Link Modification Request message may include the PC5 QoS Rule(s) for the PC5 QoS Flow(s) to be added or modified as described in clause 5.6.2.1. The Layer-2 link modification procedure may be initiated by the 5G ProSe Layer-3 UE-to-Network Relay based on the information received from the SMF via NAS signalling from SMF.

A 5G ProSe Remote UE and a 5G ProSe UE-to-Network Relay shall set up a separate PC5 unicast links if an existing unicast link(s) was established with a different Relay Service Code or without a Relay Service Code.

3GPP TS 38.331 introduced the following:

5.3.3 RRC Connection Establishment 5.3.3.1 General

Figure 9:
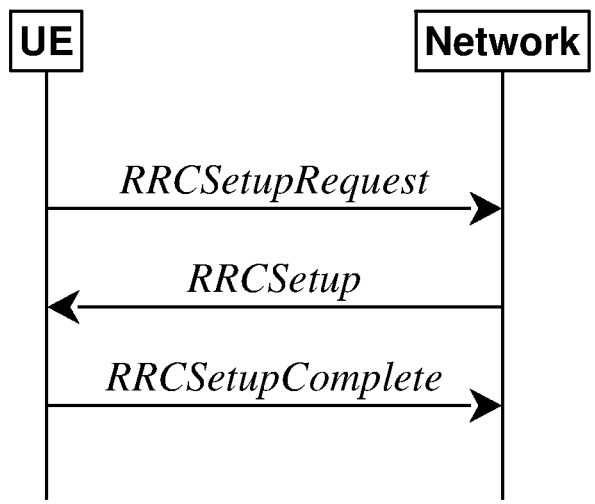
FIG. 9 is a reproduction of Figure 5.3.3.1-1 of 3GPP TS 38.331 V17.0.0.

Figure 5.3.3.1-1 of 3GPP TS 38.331 V17.0.0, Entitled "RRC Connection Establishment, Successful", is Reproduced as FIG. 9

Figure 10:
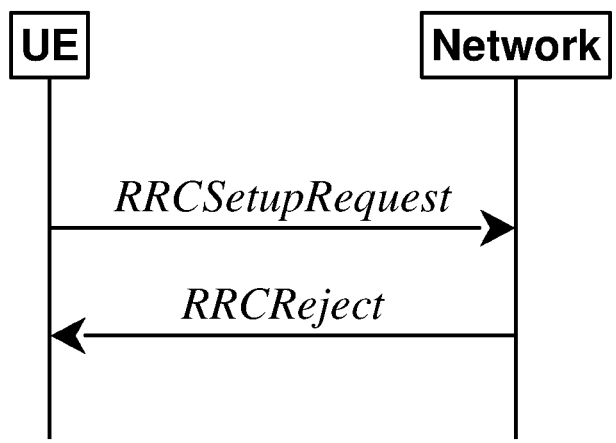
FIG. 10 is a reproduction of Figure 5.3.3.1-2 of 3GPP TS 38.331 V17.0.0.

Figure 5.3.3.1-2 of 3GPP TS 38.331 V17.0.0, Entitled "RRC Connection Establishment, Network Reject", is Reproduced as FIG. 10

The purpose of this procedure is to establish an RRC connection. RRC connection establishment involves SRB1 establishment. The procedure is also used to transfer the initial NAS dedicated information/message from the UE to the network.

The network applies the procedure e.g. as follows:

When establishing an RRC connection;

When UE is resuming or re-establishing an RRC connection, and the network is not able to retrieve or verify the UE context. In this case, UE receives RRCSetup and responds with RRCSetupComplete.

5.3.3.1a Conditions for establishing RRC Connection for NR sidelink communication/discovery/V2X sidelink communication For NR sidelink communication/discovery, an RRC connection establishment is initiated only in the following cases:

1> if configured by upper layers to transmit NR sidelink communication/discovery and related data is available for transmission:
  2> if the frequency on which the UE is configured to transmit NR sidelink communication is included in sl-FreqInfoList within SIB12 provided by the cell on which the UE camps; and if the valid version of SIB12 does not include sl-TxPoolSelectedNormal for the concerned frequency; or
  2> if the frequency on which the UE is configured to transmit NR sidelink discovery is included in sl-FreqInfoList within SIB12 provided by the cell on which the UE camps; and if the valid version of SIB12 does not include sl-DiscTxPoolSelected or sl-TxPoolSelectedNormal for the concerned frequency;

For L2 U2N Relay UE in RRC_IDLE, an RRC connection establishment is initiated in the following cases:

1> if any message is received from a L2 U2N Remote UE via SL-RLC0 as specified in 9.1.1.4 or SL-RLC1 as specified in 9.2.4;

For V2X sidelink communication, an RRC connection is initiated only when the conditions specified for V2X sidelink communication in clause 5.3.3.1a of TS 36.331 are met.

NOTE: Upper layers initiate an RRC connection. The interaction with NAS is left to UE implementation.

5.3.3.2 Initiation

The UE initiates the procedure when upper layers request establishment of an RRC connection while the UE is in RRC_IDLE and it has acquired essential system information, or for sidelink communication as specified in clause 5.3.3.1a.

The UE shall ensure having valid and up to date essential system information as specified in clause 5.2.2.2 before initiating this procedure.

Upon initiation of the procedure, the UE shall:

1> if the upper layers provide an Access Category and one or more Access Identities upon requesting establishment of an RRC connection:
  2> perform the unified access control procedure as specified in 5.3.14 using the Access Category and Access Identities provided by upper layers;
    3> if the access attempt is barred, the procedure ends;
1> if the UE is connected with a L2 U2N Relay UE via PC5-RRC connection (i.e. the UE is a L2 U2N Remote UE):
  2> apply the specified configuration of SL-RLC0 as specified in 9.1.1.4;
  2> apply the SDAP configuration and PDCP configuration as specified in 9.1.1.2 for SRB0;
1> else:
  2> apply the default L1 parameter values as specified in corresponding physical layer specifications except for the parameters for which values are provided in SIB1;
  2> apply the default MAC Cell Group configuration as specified in 9.2.2;
  2> apply the CCCH configuration as specified in 9.1.1.2;
  2> apply the timeAlignmentTimerCommon included in SIB1;
1> start timer T300;
1> initiate transmission of the RRCSetupRequest message in accordance with 5.3.3.3;

5.3.3.3 Actions Related to Transmission of RRCSetupRequest Message

The UE shall set the contents of RRCSetupRequest message as follows:

1> set the ue-Identity as follows:
  2> if upper layers provide a 5G-S-TMSI:
    3> set the ue-Identity to ng-5G-S-TMSI-Part1;
  2> else:
    3> draw a 39-bit random value in the range $0 \ldots 2^{39}-1$ and set the ue-Identity to this value;

NOTE 1: Upper layers provide the 5G-S-TMSI if the UE is registered in the TA of the current cell.

1> if the establishment of the RRC connection is the result of release with redirect with mpsPriorityIndication (either in NR or E-UTRAN):
  2> set the establishmentCause to mps-PriorityAccess;
1> else:
  2> set the establishmentCause in accordance with the information received from upper layers;

NOTE 2: In case the L2 U2N Relay UE initiates RRC connection establishment according to conditions as specified in 5.3.3.1a, the L2 U2N Relay UE sets the establishmentCause by implementation. If the cause value in the message received from the L2 U2N Remote UE via SL-RLC0 is emergency, mps-PriorityAccess, or mcs-PriorityAccess, the L2 U2N Relay UE can set the same value1 Otherwise, the L2 U2N Relay UE does not set the value as emergency, mps-PriorityAccess, or mcs-PriorityAccess.

The UE shall submit the RRCSetupRequest message to lower layers for transmission.

The UE shall continue cell re-selection related measurements as well as cell re-selection evaluation. If the conditions for cell re-selection are fulfilled, the UE shall perform cell re-selection as specified in 5.3.3.6.

NOTE 3: For L2 U2N Remote UE in RRC_IDLE/INACTIVE, the cell (re)selection procedure as specified in TS 38.304 and relay (re)selection procedure as specified in 5.8.15.3 are performed independently and up to UE implementation to select either a cell or a L2 U2N Relay UE.

5.3.3.4 Reception of the RRCSetup by the UE

Figure 11:
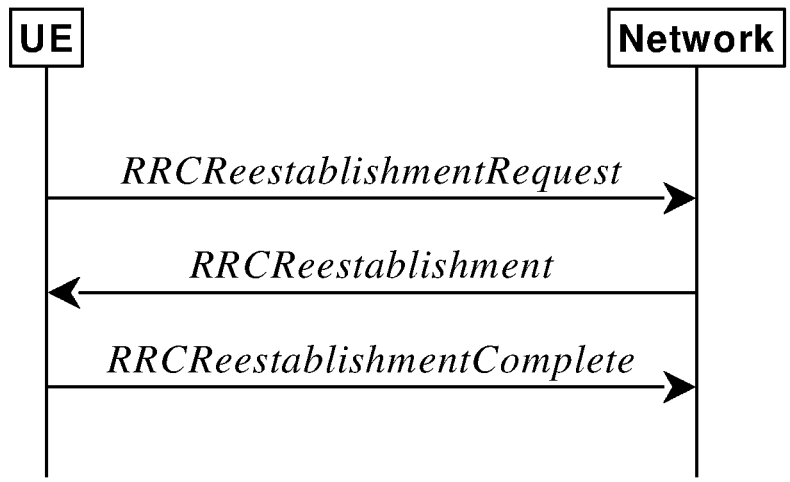
FIG. 11 is a reproduction of Figure 5.3.7.1-1 of 3GPP TS 38.331 V17.0.0.

The UE shall perform the following actions upon reception of the RRCSetup:

1> if the RRCSetup is received in response to an RRCReestablishmentRequest; or
1> if the RRCSetup is received in response to an RRCResumeRequest or RRCResumeRequest1:
  2> discard any stored UE Inactive AS context and suspendConfig;
  2> discard any current AS security context including the $K_{RRCenc}$ key, the $K_{RRCint}$ key, the $K_{UPint}$ key and the $K_{UPenc}$ key;
  2> release radio resources for all established RBs except SRB0, including release of the RLC entities, of the associated PDCP entities and of SDAP;
  2> release the RRC configuration except for the default L1 parameter values, default MAC Cell Group configuration and CCCH configuration;
  2> indicate to upper layers fallback of the RRC connection;
  2> discard any application layer measurement reports which were not transmitted yet;
  2> inform upper layers about the release of all application layer measurement configurations;
  2> stop timer T380, if running;
1> perform the cell group configuration procedure in accordance with the received masterCellGroup and as specified in 5.3.5.5;
1> perform the radio bearer configuration procedure in accordance with the received radioBearerConfig and as specified in 5.3.5.6;
1> if stored, discard the cell reselection priority information provided by the cellReselectionPriorities or inherited from another RAT;
1> stop timer T300, T301, T319 or T319a if running;
1> if T390 is running:
  2> stop timer T390 for all access categories;
  2> perform the actions as specified in 5.3.14.4;
1> if T302 is running:
  2> stop timer T302;
  2> perform the actions as specified in 5.3.14.4;
1> stop timer T320, if running;
1> if the RRCSetup is received in response to an RRCResumeRequest, RRCResumeRequest1 or RRCSetupRequest:
  2> if T331 is running:
    3> stop timer T331;
    3> perform the actions as specified in 5.7.8.3;
  2> enter RRC_CONNECTED;
  2> stop the cell re-selection procedure;
  2> stop relay (re)selection procedure if any for L2 U2N Remote UE;
1> consider the current cell to be the PCell;
1> if the RRCSetup message includes the sl-L2RemoteUEConfig (i.e. the UE is a L2 U2N Remote UE):
  2> perform the L2 U2N Remote UE configuration procedure as specified in 5.3.5.16;
1> if the UE has radio link failure or handover failure information available in VarRLF-Report and if the RPLMN is included in phnn-IdentityList stored in VarRLF-Report:
  2> if reconnectCellId in VarRLF-Report is not set, and if the received RRCSetup is in response to an RRCSetupRequest:
    3> if choCellId in VarRLF-Report is set:
      4> set time UntilReconnection in VarRLF-Report to the time that elapsed since the radio link failure or handover failure experienced in the failedPCellId stored in VarRLF-Report;
    3> else:
      4> set time UntilReconnection in VarRLF-Report to the time that elapsed since the last radio link failure or handover failure;
    3> set nrReconnectCellId in reconnectCellId in VarRLF-Report to the global cell identity and the tracking area code of the PCell;
1> if the UE supports RLF report for inter-RAT MRO NR as defined in TS 36.306 [62], and if the UE has radio link failure or handover failure information available in VarRLF-Report of TS 36.331 and if the RPLMN is included in phnn-IdentityList stored in VarRLF-Report of TS 36.331 [10]:
  2> if reconnectCellId in VarRLF-Report of TS 36.331 [10] is not set:
    3> set time UntilReconnection in VarRLF-Report of TS 36.331[10] to the time that elapsed since the last radio link failure or handover failure in LTE;
    3> set nrReconnectCellId in reconnectCellId in VarRLF-Report of TS 36.331[10] to the global cell identity and the tracking area code of the PCell;
1> set the content of RRCSetupComplete message as follows:
  2> if upper layers provide a 5G-S-TMSI:
    3> if the RRCSetup is received in response to an RRCSetupRequest:
      4> set the ng-5G-S-TMSI-Value to ng-5G-S-TMSI-Part2;
    3> else:
      4> set the ng-5G-S-TMSI-Value to ng-5G-S-TMSI;
  2> if upper layers selected an SNPN or a PLMN and in case of PLMN UE is either allowed or instructed to access the PLMN via a cell for which at least one CAG ID is broadcast:
    3> set the selectedPLMN-Identity from the npn-IdentityInfoList;
  2> else:
    3> set the selectedPLMN-Identity to the PLMN selected by upper layers from the phnn-IdentityInfoList;
  2> if upper layers provide the 'Registered AMF':
    3> include and set the registeredAMF as follows:
      4> if the PLMN identity of the 'Registered AMF' is different from the PLMN selected by the upper layers:
        5> include the phnnIdentity in the registeredAMF and set it to the value of the PLMN identity in the 'Registered AMF' received from upper layers;
      4> set the amf-Identifier to the value received from upper layers;

3> include and set the guami-Type to the value provided by the upper layers;
2> if upper layers provide one or more S-NSSAI (see TS 23.003 [21]):
  3> include the s-NSSAI-List and set the content to the values provided by the upper layers;
2> if upper layers provide onboarding request indication:
  3> include the onboardingRequest;
2> set the dedicatedNAS-Message to include the information received from upper layers;
2> if connecting as an IAB-node:
  3> include the iab-NodeIndication;
2> if the SIB1 contains idleModeMeasurementsNR and the UE has NR idle/inactive measurement information concerning cells other than the PCell available in VarMeasIdleReport; or
2> if the SIB1 contains idleModeMeasurementsEUTRA and the UE has E-UTRA idle/inactive measurement information available in VarMeasIdleReport:
  3> include the idleMeasAvailable;
2> if the UE has logged measurements available for NR and if the RPLMN is included in plmn-IdentityList stored in VarLogMeasReport:
  3> if the sigLoggedMeasType in VarLogMeasReport is included:
    4> include the sigLogMeasConfigAvailable in the RRCSetupComplete message and set it according to the following:
      5> if T330 timer is running:
        6> set sigLogMeasConfigAvailable to true in the RRCSetupComplete message;
      5> else:
        6> set sigLogMeasConfigAvailable to false in the RRCSetupComplete message;
  3> include the logMeasAvailable in the RRCSetupComplete message;
  3> if Bluetooth measurement results are included in the logged measurements the UE has available for NR:
    4> include the logMeasAvailableBT in the RRCSetupComplete message;
  3> if WLAN measurement results are included in the logged measurements the UE has available for NR:
    4> include the logMeasAvailableWLAN in the RRCSetupComplete message;
2> if the sigLoggedMeasType in VarLogMeasReport is included:
  3> if T330 timer is running:
    4> set sigLogMeasConfigAvailable to true in the RRCSetupComplete message;
  3> else:
    4> if the UE has logged measurements available for NR:
      5> set sigLogMeasConfigAvailable to false in the RRCSetupComplete message;
2> if the UE has connection establishment failure or connection resume failure information available in VarConnEstFailReport or VarConnEstFailReportList and if the RPLMN is equal to plmn-Identity stored in VarConnEstFailReport or VarConnEstFailReportList:
  3> include connEstFailInfoAvailable in the RRCSetupComplete message;
2> if the UE has radio link failure or handover failure information available in VarRLF-Report and if the RPLMN is included in plmn-IdentityList stored in VarRLF-Report, or
2> if the UE has radio link failure or handover failure information available in VarRLF-Report of TS 36.331 [10], and if the UE is capable of cross-RAT RLF reporting and if the RPLMN is included in plmn-IdentityList stored in VarRLF-Report of TS 36.331 [10]:
  3> include rlf-InfoAvailable in the RRCSetupComplete message;
2> if the UE has successful handover information available in VarSuccessHO-Report and if the RPLMN is included in plmn-IdentityList stored in VarSuccessHO-Report:
  3> include successHO-InfoAvailable in the RRCSetupComplete message;
2> if the UE supports storage of mobility history information and the UE has mobility history information available in VarMobilityHistoryReport:
  3> include the mobilityHistoryAvad in the RRCSetupComplete message;
2> if the RRCSetup is received in response to an RRCResumeRequest, RRCResumeRequest1 or RRCSetupRequest:
  3> if speedStateReselectionPars is configured in the SIB2:
    4> include the mobilityState in the RRCSetupComplete message and set it to the mobility state (as specified in TS 38.304 [20]) of the UE just prior to entering RRC_CONNECTED state;
1> submit the RRCSetupComplete message to lower layers for transmission, upon which the procedure ends.
[ . . . ]
5.3.7 RRC Connection Re-Establishment
5.3.7.1 General Figure 5.3.7.1-1 of 3GPP TS 38.331 V17.0.0, Entitled "RRC Connection Re-Establishment, Successful", is Reproduced as FIG. 11

Figure 12:
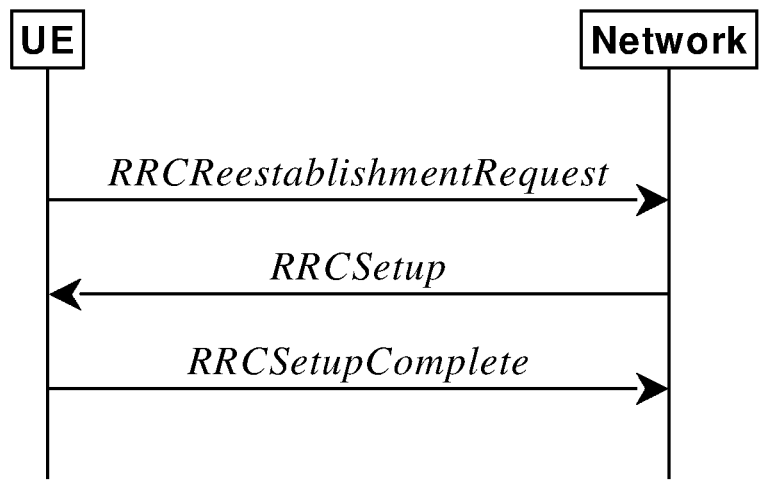
FIG. 12 is a reproduction of Figure 5.3.7.1-2 of 3GPP TS 38.331 V17.0.0.

Figure 5.3.7.1-2 of 3GPP TS 38.331 V17.0.0, Entitled "RRC Re-Establishment, Fallback to RRC Establishment, Successful", is Reproduced as FIG. 12

The purpose of this procedure is to re-establish the RRC connection. A UE in RRC_CONNECTED, for which AS security has been activated with SRB2 and at least one DRB/multicast MRB setup or, for IAB, SRB2, may initiate the procedure in order to continue the RRC connection. The connection re-establishment succeeds if the network is able to find and verify a valid UE context or, if the UE context cannot be retrieved, and the network responds with an RRCSetup according to clause 5.3.3.4.
The network applies the procedure e.g as follows:
When AS security has been activated and the network retrieves or verifies the UE context:
  to re-activate AS security without changing algorithms;
  to re-establish and resume the SRB1;
When UE is re-establishing an RRC connection, and the network is not able to retrieve or verify the UE context:
  to discard the stored AS Context and release all RBs and BH RLC channels and Uu Relay RLC channels;
  to fallback to establish a new RRC connection.

If AS security has not been activated, the UE shall not initiate the procedure but instead moves to RRC_IDLE directly, with release cause 'other'. If AS security has been activated, but SRB2 and at least one DRB or multicast MRB or, for IAB, SRB2, are not setup, the UE does not initiate the procedure but instead moves to RRC_IDLE directly, with release cause 'RRC connection failure'.

5.3.7.2 Initiation

The UE initiates the procedure when one of the following conditions is met:

1> upon detecting radio link failure of the MCG and t316 is not configured, in accordance with 5.3.10; or
1> upon detecting radio link failure of the MCG while SCG transmission is suspended, in accordance with 5.3.10; or
1> upon detecting radio link failure of the MCG while PSCell change or PSCell addition is ongoing, in accordance with 5.3.10; or
1> upon re-configuration with sync failure of the MCG, in accordance with clause 5.3.5.8.3; or
1> upon mobility from NR failure, in accordance with clause 5.4.3.5; or
1> upon integrity check failure indication from lower layers concerning SRB1 or SRB2, except if the integrity check failure is detected on the RRCReestablishment message; or
1> upon an RRC connection reconfiguration failure, in accordance with clause 5.3.5.8.2; or
1> upon detecting radio link failure for the SCG while MCG transmission is suspended, in accordance with clause 5.3.10.3 in NR-DC or in accordance with TS 36.331 [10] clause 5.3.11.3 in NE-DC; or
1> upon reconfiguration with sync failure of the SCG while MCG transmission is suspended in accordance with clause 5.3.5.8.3; or
1> upon SCG change failure while MCG transmission is suspended in accordance with TS 36.331 [10] clause 5.3.5.7a; or
1> upon SCG configuration failure while MCG transmission is suspended in accordance with clause 5.3.5.8.2 in NR-DC or in accordance with TS 36.331 [10] clause 5.3.5.5 in NE-DC; or
1> upon integrity check failure indication from SCG lower layers concerning SRB3 while MCG is suspended; or
1> upon T316 expiry, in accordance with clause 5.7.3b.5; or
1> upon detecting sidelink radio link failure by L2 U2N Remote UE in RRC_CONNECTED, in accordance with clause 5.8.9.3; or
1> upon reception of NotificationMessageSidelink including indicationType by L2 U2N Remote UE in RRC_CONNECTED, in accordance with clause 5.8.9.10.

Upon initiation of the procedure, the UE shall:
1> stop timer T310, if running;
1> stop timer T312, if running;
1> stop timer T304, if running;
1> start timer T311;
1> stop timer T316, if running;
1> if UE is not configured with conditionalReconfiguration:
2> reset MAC;
2> release spCellConfig, if configured;
2> suspend all RBs, and BH RLC channels for IAB-MT, and Uu Relay RLC channels for L2 U2N Relay UE, except SRB0;
2> release the MCG SCell(s), if configured;
2> if MR-DC is configured:
3> perform MR-DC release, as specified in clause 5.3.5.10;
2> release delayBudgetReportingConfig, if configured and stop timer T342, if running;
2> release overheatingAssistanceConfig, if configured and stop timer T345, if running;
2> release idc-AssistanceConfig, if configured;
2> release btNameList, if configured;
2> release wlanNameList, if configured;
2> release sensorNameList, if configured;
2> release drx-PreferenceConfig for the MCG, if configured and stop timer T346a associated with the MCG, if running;
2> release maxBW-PreferenceConfig for the MCG, if configured and stop timer T346b associated with the MCG, if running;
2> release maxCC-PreferenceConfig for the MCG, if configured and stop timer T346c associated with the MCG, if running;
2> release maxMIMO-LayerPreferenceConfig for the MCG, if configured and stop timer T346d associated with the MCG, if running;
2> release minSchedulingOffsetPreferenceConfig for the MCG, if configured stop timer T346e associated with the MCG, if running;
2> release rlm-RelaxationReportingConfig for the MCG, if configured and stop timer T346j associated with the MCG, if running;
2> release bfd-RelaxationReportingConfig for the MCG, if configured and stop timer T346k associated with the MCG, if running;
2> release releasePreferenceConfig, if configured stop timer T346f, if running;
2> release onDemandSIB-Request if configured, and stop timer T350, if running;
2> release referenceTimePreferenceReporting, if configured;
2> release sl-AssistanceConfigNR, if configured;
2> release obtainCommonLocation, if configured;
2> release musim-GapAssistanceConfig, if configured and stop timer T346h, if running;
2> release musim-LeaveAssistanceConfig, if configured;
2> release scg-DeactivationPreferenceConfig, if configured, and stop timer T346i, if running;
1> release successHO-Config, if configured;
1> if any DAPS bearer is configured:
2> reset the source MAC and release the source MAC configuration;
2> for each DAPS bearer:
3> release the RLC entity or entities as specified in TS 38.322 [4], clause 5.1.3, and the associated logical channel for the source SpCell;
3> reconfigure the PDCP entity to release DAPS as specified in TS 38.323 [5];
2> for each SRB:
3> release the PDCP entity for the source SpCell;
3> release the RLC entity as specified in TS 38.322 [4], clause 5.1.3, and the associated logical channel for the source SpCell;
2> release the physical channel configuration for the source SpCell;
2> discard the keys used in the source SpCell (the $K_{gNB}$ key, the $K_{RRCenc}$ key, the $K_{RRCint}$ key, the $K_{UPint}$ key and the $K_{UPenc}$ key), if any;

1> release sl-L2RelayUEConfig, if configured;
1> release sl-L2RemoteUEConfig, if configured;
1> release the SRAP entity, if configured;
1> if the UE is connected with a L2 U2N Relay UE via PC5-RRC connection (i.e. the UE is a L2 U2N Remote UE):
   2> if the PC5-RRC connection with the U2N Relay UE is determined to be released:
      3> perform the PC5-RRC connection release as specified in 5.8.9.5;
      3> perform either cell selection in accordance with the cell selection process as specified in TS 38.304 [20], or relay selection as specified in clause 5.8.15.3, or both;
   2> else maintain the PC5 RRC connection and stop T311 if running;
NOTE 1: It is up to Remote UE implementation whether to release or keep the current unicast PC5 link.
1> else:
   2> perform cell selection in accordance with the cell selection process as specified in TS 38.304 [20].
NOTE 2: For L2 U2N Remote UE, if both a suitable cell and a suitable relay are available, the UE can select either one based on its implementation.

5.3.7.3 Actions Following Cell Selection while T311 is Running

Upon selecting a suitable NR cell, the UE shall:
1> ensure having valid and up to date essential system information as specified in clause 5.2.2.2;
1> stop timer T311;
1> if T390 is running:
   2> stop timer T390 for all access categories;
   2> perform the actions as specified in 5.3.14.4;
1> if the cell selection is triggered by detecting radio link failure of the MCG or re-configuration with sync failure of the MCG or mobility from NR failure, and
1> if attemptCondReconfig is configured; and
1> if the selected cell is one of the candidate cells for which the reconfigurationWithSync is included in the masterCellGroup in VarConditionalReconfig:
   2> set the choCellId in the VarRLF-Report to the global cell identity and tracking area code, if available, otherwise to the physical cell identity and carrier frequency of the selected cell;
   2> apply the stored condRRCReconfig associated to the selected cell and perform actions as specified in 5.3.5.3;
NOTE 1: It is left to network implementation to how to avoid keystream reuse in case of CHO based recovery after a failed handover without key change.
1> else:
   2> if UE is configured with conditionalReconfiguration:
      3> reset MAC;
      3> release spCellConfig, if configured;
      3> release the MCG SCell(s), if configured;
      3> release delayBudgetReportingConfig, if configured and stop timer T342, if running;
      3> release overheatingAssistanceConfig, if configured and stop timer T345, if running;
      3> if MR-DC is configured:
         4> perform MR-DC release, as specified in clause 5.3.5.10;
      3> release idc-AssistanceConfig, if configured;
      3> release btNameList, if configured;
      3> release wlanNameList, if configured;
      3> release sensorNameList, if configured;
      3> release drx-PreferenceConfig for the MCG, if configured and stop timer T346a associated with the MCG, if running;
      3> release maxBW-PreferenceConfig for the MCG, if configured and stop timer T346b associated with the MCG, if running;
      3> release maxCC-PreferenceConfig for the MCG, if configured and stop timer T346c associated with the MCG, if running;
      3> release maxMIMO-LayerPreferenceConfig for the MCG, if configured and stop timer T346d associated with the MCG, if running;
      3> release minSchedulingOffsetPreferenceConfig for the MCG, if configured and stop timer T346e associated with the MCG, if running;
      3> release rlm-RelaxationReportingConfig for the MCG, if configured and stop timer T346j associated with the MCG, if running;
      3> release bfd-RelaxationReportingConfig for the MCG, if configured and stop timer T346k associated with the MCG, if running;
      3> release releasePreferenceConfig, if configured and stop timer T346f, if running;
      3> release onDemandSIB-Request if configured, and stop timer T350, if running;
      3> release referenceTimePreferenceReporting, if configured;
      3> release sl-AssistanceConfigNR, if configured;
      3> release obtainCommonLocation, if configured;
      3> release scg-DeactivationPreferenceConfig, if configured, and stop timer T346i, if running;
      3> suspend all RBs, except SRB0;
   2> remove all the entries within VarConditionalReconfig, if any;
   2> for each measId, if the associated reportConfig has a reportType set to condTriggerConfig:
      3> for the associated reportConfigId:
         4> remove the entry with the matching reportConfigId from the reportConfigList within the VarMeasConfig;
      3> if the associated measObjectId is only associated to a reportConfig with reportType set to condTriggerConfig:
         4> remove the entry with the matching measObjectId from the measObjectList within the VarMeasConfig;
      3> remove the entry with the matching measId from the measIdList within the VarMeasConfig;
   2> start timer T301;
   2> apply the default L1 parameter values as specified in corresponding physical layer specifications except for the parameters for which values are provided in SIB1;
   2> apply the default MAC Cell Group configuration as specified in 9.2.2;
   2> apply the CCCH configuration as specified in 9.1.1.2;
   2> apply the timeAlignmentTimerCommon included in SIB1;
   2> initiate transmission of the RRCReestablishmentRequest message in accordance with
NOTE 2: This procedure applies also if the UE returns to the source PCell.
Upon selecting an inter-RAT cell, the UE shall:
1> perform the actions upon going to RRC_IDLE as specified in 5.3.11, with release cause 'RRC connection failure'.

5.3.7.3a Actions Following Relay Selection while T311 is Running

Upon selecting a suitable L2 U2N Relay UE, the L2 U2N Remote UE shall:
- 1> ensure having valid and up to date essential system information as specified in clause
- 1> stop timer T311;
- 1> if T390 is running:
  - 2> stop timer T390 for all access categories;
  - 2> perform the actions as specified in 5.3.14.4;
- 1> start timer T301;
- 1> apply the specified configuration of SL-RLC0 as specified in 9.1.1.4;
- 1> apply the SDAP configuration and PDCP configuration as specified in 9.1.1.2 for SRB0;
- 1> initiate transmission of the RRCReestablishmentRequest message in accordance with 5.3.7.4.

5.3.7.4 Actions Related to Transmission of RRCReestablishmentRequest Message

The UE shall set the contents of RRCReestablishmentRequest message as follows:
- 1> if the procedure was initiated due to radio link failure as specified in 5.3.10.3 or reconfiguration with sync failure as specified in 5.3.5.8.3:
  - 2> set the reestablishmentCellId in the VarRLF-Report to the global cell identity of the selected cell;
- 1> set the ue-Identity as follows:
  - 2> set the c-RNTI to the C-RNTI used in the source PCell (reconfiguration with sync or mobility from NR failure) or used in the PCell in which the trigger for the re-establishment occurred (other cases);
  - 2> set the physCellId to the physical cell identity of the source PCell (reconfiguration with sync or mobility from NR failure) or of the PCell in which the trigger for the re-establishment occurred (other cases);
  - 2> set the shortMAC-I to the 16 least significant bits of the MAC-I calculated:
    - 3> over the ASN.1 encoded as per clause 8 (i.e., a multiple of 8 bits) VarShortMAC-Input;
    - 3> with the $K_{RRCint}$ key and integrity protection algorithm that was used in the source PCell (reconfiguration with sync or mobility from NR failure) or of the PCell in which the trigger for the re-establishment occurred (other cases); and
    - 3> with all input bits for COUNT, BEARER and DIRECTION set to binary ones;
- 1> set the reestablishmentCause as follows:
  - 2> if the re-establishment procedure was initiated due to reconfiguration failure as specified in 5.3.5.8.2:
    - 3> set the reestablishmentCause to the value reconfigurationFailure;
  - 2> else if the re-establishment procedure was initiated due to reconfiguration with sync failure as specified in 5.3.5.8.3 (intra-NR handover failure) or 5.4.3.5 (inter-RAT mobility from NR failure):
    - 3> set the reestablishmentCause to the value handoverFailure;
  - 2> else:
    - 3> set the reestablishmentCause to the value otherFailure;
- 1> re-establish PDCP for SRB1;
- 1> if the UE is connected with a L2 U2N Relay UE via PC5-RRC connection (i.e. the UE is a L2 U2N Remote UE):
  - 2> apply the default configuration of SL-RLC1 as defined in 9.2.4 for SRB1;
  - 2> apply the default configuration of PDCP defined in 9.2.1 for SRB1;
- 1> else:
  - 2> re-establish RLC for SRB1;
  - 2> apply the default configuration defined in 9.2.1 for SRB1;
- 1> configure lower layers to suspend integrity protection and ciphering for SRB1;

NOTE: Ciphering is not applied for the subsequent RRCReestablishment message used to resume the connection. An integrity check is performed by lower layers, but merely upon request from RRC.

- 1> resume SRB1;
- 1> submit the RRCReestablishmentRequest message to lower layers for transmission.

5.3.7.5 Reception of the RRCReestablishment by the UE

The UE shall:
- 1> stop timer T301;
- 1> if the RRCReestablishment message includes the sl-L2RemoteUEConfig (i.e. the UE is a L2 U2N Remote UE):
  - 2> perform the L2 U2N Remote UE configuration procedure as specified in 5.3.5.16;
- 1> else:
  - 2> consider the current cell to be the PCell;
- 1> update the $K_{gNB}$ key based on the current $K_{gNB}$ key or the NH, using the received nextHopChainingCount value, as specified in TS 33.501 [11];
- 1> store the nextHopChainingCount value indicated in the RRCReestablishment message;
- 1> derive the $K_{RRCenc}$ and $K_{UPenc}$ keys associated with the previously configured cipheringAlgorithm, as specified in TS 33.501 [11];
- 1> derive the $K_{RRCint}$ and $K_{UPint}$ keys associated with the previously configured integrityProtAlgorithm, as specified in TS 33.501 [11].
- 1> request lower layers to verify the integrity protection of the RRCReestablishment message, using the previously configured algorithm and the $K_{RRCint}$ key;
- 1> if the integrity protection check of the RRCReestablishment message fails:
  - 2> perform the actions upon going to RRC_IDLE as specified in 5.3.11, with release cause 'RRC connection failure', upon which the procedure ends;
- 1> configure lower layers to resume integrity protection for SRB1 using the previously configured algorithm and the $K_{RRCint}$ key immediately, i.e., integrity protection shall be applied to all subsequent messages received and sent by the UE, including the message used to indicate the successful completion of the procedure;
- 1> configure lower layers to resume ciphering for SRB1 using the previously configured algorithm and, the $K_{RRCenc}$ key immediately, i.e., ciphering shall be applied to all subsequent messages received and sent by the UE, including the message used to indicate the successful completion of the procedure;
- 1> release the measurement gap configuration indicated by the measGapConfig, if configured;
- 1> release the measurement gap configuration indicated by the musim-GapConfig, if configured;
- 1> set the content of RRCReestablishmentComplete message as follows:
  - 2> if the UE has logged measurements available for NR and if the RPLMN is included in phnn-IdentityList stored in VarLogMeasReport:

3> if the sigLoggedMeasType in VarLogMeasReport is included:
    4> include the sigLogMeasConfigAvailable in the RRCReestablishmentComplete message and set it according to the following:
        5> if T330 timer is running:
            6> set sigLogMeasConfigAvailable to true in the RRCReestablishmentComplete message;
        5> else:
            6> set sigLogMeasConfigAvailable to false in the RRCReestablishmentComplete message;
3> include the logMeasAvailable in the RRCReestablishmentComplete message;
3> if Bluetooth measurement results are included in the logged measurements the UE has available for NR:
    4> include the logMeasAvailableBT in the RRCReestablishmentComplete message;
3> if WLAN measurement results are included in the logged measurements the UE has available for NR:
    4> include the logMeasAvailableWLAN in the RRCReestablishmentComplete message;
2> if the sigLoggedMeasType in VarLogMeasReport is included:
    3> if T330 timer is running:
        4> set sigLogMeasConfigAvailable to true in the RRCReestablishmentComplete message;
    3> else:
        4> if the UE has logged measurements available for NR:
            5> set sigLogMeasConfigAvailable to false in the RRCReestablishmentComplete message;
2> if the UE has connection establishment failure or connection resume failure information available in VarConnEstFailReport or VarConnEstFailReportList and if the RPLMN is equal to Mmn-Identity stored in VarConnEstFailReport or VarConnEstFailReportList:
    3> include connEstFailInfoAvailable in the RRCReestablishmentComplete message;
2> if the UE has radio link failure or handover failure information available in VarRLF-Report and if the RPLMN is included in plmn-IdentityList stored in VarRLF-Report; or
2> if the UE has radio link failure or handover failure information available in VarRLF-Report of TS 36.331 and if the UE is capable of cross-RAT RLF reporting and if the RPLMN is included in plmn-IdentityList stored in VarRLF-Report of TS 36.331 [10]:
    3> include rlf-InfoAvadable in the RRCReestablishmentComplete message;
2> if the UE has successful handover information available in VarSuccessHO-Report and if the RPLMN is included in plmn-IdentityList stored in VarSuccessHO-Report:
    3> include successHO-InfoAvailable in the RRCReestablishmentComplete message;
1> submit the RRCReestablishmentComplete message to lower layers for transmission;
1> the procedure ends.

5.3.7.6 T311 Expiry

Upon T311 expiry, the UE shall:
1> if the procedure was initiated due to radio link failure or handover failure:
    2> set the noSuitableCellFound in the VarRLF-Report to true;
1> perform the actions upon going to RRC_IDLE as specified in 5.3.11, with release cause 'RRC connection failure'.

5.3.7.7 T301 Expiry or Selected Cell No Longer Suitable

The UE shall:
1> if timer T301 expires; or
1> if the selected cell becomes no longer suitable according to the cell selection criteria as specified in TS 38.304 [20]:
    2> perform the actions upon going to RRC_IDLE as specified in 5.3.11, with release cause 'RRC connection failure'.

[ . . . ]

7.1.1 Timers (Informative)

| Timer | Start | Stop | At expiry |
|---|---|---|---|
| T301 | Upon transmission of RRCReestabilshmentRequest | Upon reception of RRCReestablishment or RRCSetup message as well as when the selected cell becomes unsuitable or the (re)selected L2 U2N Relay UE becomes unsuitable. | Go to RRC_IDLE |
| T310 | Upon detecting physical layer problems for the SpCell i.e. upon receiving N310 consecutive out-of-sync indications from lower layers. | Upon receiving N311 consecutive in-sync indications from lower layers for the SpCell, upon receiving RRCReconfiguration with reconfigurationWithSync for that cell group, upon reception of Mobility FromNRCommand, upon the reconfiguration of rlf-TimersAndConstant, upon initiating the connection re-establishment procedure, upon conditional reconfiguration execution i.e. when applying a stored RRCReconfiguration message including reconfigurationWithSync for that cell group, and upon initiating the MCG failure information procedure. | If the T310 is kept in MCG: If AS security is not activated: go to RRC_IDLE else: initiate the MCG failure information procedure as specified in 5.7.3b or the connection re-establishment procedure as specified in 5.3.7 or the procedure as specified in 5.3.10.3 if any DAPS bearer is configured. If the T310 is kept in SCG, Inform E-UTRAN/NR about the SCG radio link failure by initiating the SCG failure information procedure as specified in 5.7.3. |

| Timer | Start | Stop | At expiry |
|---|---|---|---|
| T311 | Upon initiating the RRC connection re-establishment procedure | Upon SCG release, if the T310 is kept in SCG. Upon selection of a suitable NR cell, or upon selection of a suitable L2 U2N Relay UE, or a cell using another RAT. | Enter RRC_IDLE |

A running CR of 3GPP TS 38.331 introduced the following:

5.3.7.2 Initiation

The UE initiates the procedure when one of the following conditions is met:
1> upon detecting radio link failure of the MCG and t316 is not configured, in accordance with 5.3.10; or
1> upon detecting radio link failure of the MCG while SCG transmission is suspended, in accordance with 5.3.10; or
1> upon detecting radio link failure of the MCG while PSCell change or PSCell addition is ongoing, in accordance with 5.3.10; or
1> upon detecting radio link failure of the MCG while the SCG is deactivated, in accordance with 5.3.10; or
1> upon re-configuration with sync failure of the MCG, in accordance with clause 5.3.5.8.3; or
1> upon mobility from NR failure, in accordance with clause 5.4.3.5; or
1> upon integrity check failure indication from lower layers concerning SRB1 or SRB2, except if the integrity check failure is detected on the RRCReestablishment message; or
1> upon an RRC connection reconfiguration failure, in accordance with clause 5.3.5.8.2; or
1> upon detecting radio link failure for the SCG while MCG transmission is suspended, in accordance with clause 5.3.10.3 in NR-DC or in accordance with TS 36.331 clause 5.3.11.3 in NE-DC; or
1> upon reconfiguration with sync failure of the SCG while MCG transmission is suspended in accordance with clause 5.3.5.8.3; or
1> upon SCG change failure while MCG transmission is suspended in accordance with TS 36.331 [10] clause 5.3.5.7a; or
1> upon SCG configuration failure while MCG transmission is suspended in accordance with clause 5.3.5.8.2 in NR-DC or in accordance with TS 36.331 clause 5.3.5.5 in NE-DC; or
1> upon integrity check failure indication from SCG lower layers concerning SRB3 while MCG is suspended; or
1> upon T316 expiry, in accordance with clause 5.7.3b.5; or
1> upon detecting sidelink radio link failure by L2 U2N Remote UE in RRC_CONNECTED, in accordance with clause 5.8.9.3; or
1> upon reception of NotificationMessageSidelink including indicationType by L2 U2N Remote UE in RRC_CONNECTED, in accordance with clause 5.8.9.10; or
1> upon PC5 unicast link release indicated by upper layer at L2 U2N Remote UE in RRC_CONNECTED.

Upon initiation of the procedure, the UE shall:
1> stop timer T310, if running;
1> stop timer T312, if running;
1> stop timer T304, if running;
1> start timer T311;
1> stop timer T316, if running;
1> if UE is not configured with attemptCondReconfig:
  2> reset MAC;
  2> release spCellConfig, if configured;
  2> suspend all RBs, and BH RLC channels for IAB-MT, and Uu Relay RLC channels for L2 U2N Relay UE, except SRB0 and broadcast MRBs;
  2> release the MCG SCell(s), if configured;
  2> if MR-DC is configured:
    3> perform MR-DC release, as specified in clause 5.3.5.10;
  2> release delayBudgetReportingConfig, if configured and stop timer T342, if running;
  2> release overheatingAssistanceConfig, if configured and stop timer T345, if running;
  2> release idc-AssistanceConfig, if configured;
  2> release btNameList, if configured;
  2> release wlanNameList, if configured;
  2> release sensorNameList, if configured;
  2> release drx-PreferenceConfig for the MCG, if configured and stop timer T346a associated with the MCG, if running;
  2> release maxBW-PreferenceConfig for the MCG, if configured and stop timer T346b associated with the MCG, if running;
  2> release maxCC-PreferenceConfig for the MCG, if configured and stop timer T346c associated with the MCG, if running;
  2> release maxMIMO-LayerPreferenceConfig for the MCG, if configured and stop timer T346d associated with the MCG, if running;
  2> release minSchedulingOffsetPreferenceConfig for the MCG, if configured stop timer T346e associated with the MCG, if running;
  2> release rlm-RelaxationReportingConfig for the MCG, if configured and stop timer T346j associated with the MCG, if running;
  2> release bfd-RelaxationReportingConfig for the MCG, if configured and stop timer T346k associated with the MCG, if running;
  2> release releasePreferenceConfig, if configured stop timer T346f, if running;
  2> release onDemandSIB-Request if configured, and stop timer T350, if running;
  2> release referenceTimePreferenceReporting, if configured;
  2> release sl-AssistanceConfigNR, if configured;
  2> release obtainCommonLocation, if configured;
  2> release musim-GapAssistanceConfig, if configured and stop timer T346h, if running;
  2> release musim-LeaveAssistanceConfig, if configured;
  2> release ul-GapFR2-PreferenceConfig, if configured;

2> release scg-DeactivationPreferenceConfig, if configured, and stop timer T346i, if running;
2> release propDelayDiffReportConfig, if configured;
2> release rrm-MeasRelaxationReportingConfig, if configured;
1> release successHO-Config, if configured;
1> if any DAPS bearer is configured:
2> reset the source MAC and release the source MAC configuration;
2> for each DAPS bearer:
3> release the RLC entity or entities as specified in TS 38.322 [4], clause 5.1.3, and the associated logical channel for the source SpCell;
3> reconfigure the PDCP entity to release DAPS as specified in TS 38.323 [5];
2> for each SRB:
3> release the PDCP entity for the source SpCell;
3> release the RLC entity as specified in TS 38.322 [4], clause 5.1.3, and the associated logical channel for the source SpCell;
2> release the physical channel configuration for the source SpCell;
2> discard the keys used in the source SpCell (the $K_{gNB}$ key, the $K_{RRCenc}$ key, the $K_{RRCint}$ key, the $K_{UPint}$ key and the $K_{UPenc}$ key), if any;
1> release sl-L2RelayUE-Config, if configured;
1> release sl-L2RemoteUE-Config, if configured;
1> release the SRAP entity, if configured;
1> if the UE is acting as L2 U2N Remote UE:
2> if the PC5-RRC connection with the U2N Relay UE is determined to be released:
3> perform the PC5-RRC connection release as specified in 5.8.9.5; 3> perform either cell selection in accordance with the cell selection process as specified in TS 38.304 [20], or relay selection as specified in clause 5.8.15.3, or both;
2> else:
3> maintain the PC5 RRC connection and stop T311 if running;
NOTE 1: It is up to Remote UE implementation whether to release or keep the current PC5 unicast link.
1> else:
2> perform cell selection in accordance with the cell selection process as specified in TS 38.304 [20].
NOTE 2: For L2 U2N Remote UE, if both a suitable cell and a suitable relay are available, the UE can select either one based on its implementation.

5.3.7.3 Actions Following Cell Selection while T311 is Running

Upon selecting a suitable NR cell, the UE shall:
1> ensure having valid and up to date essential system information as specified in clause 5.2.2.2;
1> stop timer T311;
1> if T390 is running:
2> stop timer T390 for all access categories;
2> perform the actions as specified in 5.3.14.4;
1> stop the relay (re)selection procedure, if ongoing;
1> if the cell selection is triggered by detecting radio link failure of the MCG or re-configuration with sync failure of the MCG or mobility from NR failure, and
1> if attemptCondReconfig is configured; and
1> if the selected cell is not configured with CondEventT1, or the selected cell is configured with CondEventT1 and leaving condition has not been fulfilled; and
1> if the selected cell is one of the candidate cells for which the reconfigurationWithSync is included in the masterCellGroup in VarConditionalReconfig:
2> if the UE supports RLF-Report for conditional handover, set the choCellId in the VarRLF-Report to the global cell identity, if available, otherwise to the physical cell identity and carrier frequency of the selected cell;
2> apply the stored condRRCReconfig associated to the selected cell and perform actions as specified in 5.3.5.3;
NOTE 1: It is left to network implementation to how to avoid keystream reuse in case of CHO based recovery after a failed handover without key change.
1> else:
2> if UE is configured with attemptCondReconfig:
3> reset MAC;
3> release spCellConfig, if configured;
3> release the MCG SCell(s), if configured;
3> release delayBudgetReportingConfig, if configured and stop timer T342, if running;
3> release overheatingAssistanceConfig, if configured and stop timer T345, if running;
3> if MR-DC is configured:
4> perform MR-DC release, as specified in clause 5.3.5.10;
3> release idc-AssistanceConfig, if configured;
3> release btNameList, if configured;
3> release wlanNameList, if configured;
3> release sensorNameList, if configured;
3> release drx-PreferenceConfig for the MCG, if configured and stop timer T346a associated with the MCG, if running;
3> release maxBW-PreferenceConfig for the MCG, if configured and stop timer T346b associated with the MCG, if running;
3> release maxCC-PreferenceConfig for the MCG, if configured and stop timer T346c associated with the MCG, if running;
3> release maxMIMO-LayerPreferenceConfig for the MCG, if configured and stop timer T346d associated with the MCG, if running;
3> release minSchedulingOffsetPreferenceConfig for the MCG, if configured and stop timer T346e associated with the MCG, if running;
3> release rlm-RelaxationReportingConfig for the MCG, if configured and stop timer T346j associated with the MCG, if running;
3> release bfd-RelaxationReportingConfig for the MCG, if configured and stop timer T346k associated with the MCG, if running;
3> release releasePreferenceConfig, if configured and stop timer T346f, if running;
3> release onDemandSIB-Request if configured, and stop timer T350, if running;
3> release referenceTimePreferenceReporting, if configured;
3> release sl-AssistanceConfigNR, if configured;
3> release obtainCommonLocation, if configured;
3> release scg-DeactivationPreferenceConfig, if configured, and stop timer T346i, if running;
3> release musim-GapAssistanceConfig, if configured and stop timer T346h, if running;
3> release musim-LeaveAssistanceConfig, if configured;
3> release propDelayDiffReportConfig, if configured;
3> release ul-GapFR2-PreferenceConfig, if configured;

3> release rrm-MeasRelaxationReportingConfig, if configured;
3> suspend all RBs, and BH RLC channels for the IAB-MT, except SRB0;
2> remove all the entries within VarConditionalReconfig, if any;
2> for each measId, if the associated reportConfig has a reportType set to condTriggerConfig:
3> for the associated reportConfigId:
4> remove the entry with the matching reportConfigId from the reportConfigList within the VarMeasConfig;
3> if the associated measObjectId is only associated to a reportConfig with reportType set to condTriggerConfig:
4> remove the entry with the matching measObjectId from the measObjectList within the VarMeasConfig;
3> remove the entry with the matching measId from the measIdList within the VarMeasConfig;
2> start timer T301;
2> apply the default L1 parameter values as specified in corresponding physical layer specifications except for the parameters for which values are provided in SIB1;
2> apply the default MAC Cell Group configuration as specified in 9.2.2;
2> apply the CCCH configuration as specified in 9.1.1.2;
2> apply the timeAlignmentTimerCommon included in SIB1;
2> initiate transmission of the RRCReestablishmentRequest message in accordance with 5.3.7.4;
NOTE 2: This procedure applies also if the UE returns to the source PCell.
Upon selecting an inter-RAT cell, the UE shall:
1> perform the actions upon going to RRC_IDLE as specified in 5.3.11, with release cause 'RRC connection failure'.

5.3.7.3a Actions Following Relay Selection while T311 is Running

Upon selecting a suitable L2 U2N Relay UE, the L2 U2N Remote UE shall:
1> ensure having valid and up to date essential system information as specified in clause 5.2.2.2;
1> stop timer T311;
1> if T390 is running:
2> stop timer T390 for all access categories;
2> perform the actions as specified in 5.3.14.4;
1> stop the cell (re)selection procedure, if ongoing;
1> start timer T301;
1> apply the specified configuration of SL-RLC0 as specified in 9.1.1.4;
1> apply the SDAP configuration and PDCP configuration as specified in 9.1.1.2 for SRB0;
1> initiate transmission of the RRCReestablishmentRequest message in accordance with 5.3.7.4 Actions Related to Transmission of RRCReestablishmentRequest Message The UE shall set the contents of RRCReestablishmentRequest message as follows:
1> if the procedure was initiated due to radio link failure as specified in 5.3.10.3 or reconfiguration with sync failure as specified in 5.3.5.8.3:
2> set the reestablishmentCellId in the VarRLF-Report to the global cell identity of the selected cell;
1> set the ue-Identity as follows:
2> set the c-RNTI to the C-RNTI used in the source PCell (reconfiguration with sync or mobility from NR failure) or used in the PCell in which the trigger for the re-establishment occurred (other cases);
2> set the physCellId to the physical cell identity of the source PCell (reconfiguration with sync or mobility from NR failure) or of the PCell in which the trigger for the re-establishment occurred (other cases);
2> set the shortMAC-I to the 16 least significant bits of the MAC-I calculated:
3> over the ASN.1 encoded as per clause 8 (i.e., a multiple of 8 bits) VarShortMAC-Input;
3> with the $K_{RRCint}$ key and integrity protection algorithm that was used in the source PCell (reconfiguration with sync or mobility from NR failure) or of the PCell in which the trigger for the re-establishment occurred (other cases); and
3> with all input bits for COUNT, BEARER and DIRECTION set to binary ones;
1> set the reestablishmentCause as follows:
2> if the re-establishment procedure was initiated due to reconfiguration failure as specified in 5.3.5.8.2:
3> set the reestablishmentCause to the value reconfigurationFailure;
2> else if the re-establishment procedure was initiated due to reconfiguration with sync failure as specified in 5.3.5.8.3 (intra-NR handover failure) or 5.4.3.5 (inter-RAT mobility from NR failure):
3> set the reestablishmentCause to the value handoverFailure;
2> else:
3> set the reestablishmentCause to the value otherFailure;
1> re-establish PDCP for SRB1;
1> if the UE is acting as L2 U2N Remote UE:
2> establish or re-established (e.g. via release and add) SL RLC entity for SRB1;
2> apply the default configuration of SL-RLC1 as defined in 9.2.4 for SRB1;
2> apply the default configuration of PDCP as defined in 9.2.1 for SRB1;
2> establish the SRAP entity and apply the default configuration of SRAP as defined in 9.2.5 for SRB1;
1> else:
2> re-establish RLC for SRB1;
2> apply the default configuration defined in 9.2.1 for SRB1;
1> configure lower layers to suspend integrity protection and ciphering for SRB1;
NOTE: Ciphering is not applied for the subsequent RRCReestablishment message used to resume the connection. An integrity check is performed by lower layers, but merely upon request from RRC.
1> resume SRB1;
1> submit the RRCReestablishmentRequest message to lower layers for transmission.

5.3.7.5 Reception of the RRCReestablishment by the UE

The UE shall:
1> stop timer T301;
1> consider the current cell to be the PCell;
1> update the $K_{gNB}$ key based on the current $K_{gNB}$ key or the NH, using the received nextHopChainingCount value, as specified in TS 33.501 [11];
1> store the nextHopChainingCount value indicated in the RRCReestablishment message;

1> derive the $K_{RRCenc}$ and $K_{UPenc}$ keys associated with the previously configured cipheringAlgorithm, as specified in TS 33.501 [11];
1> derive the $K_{RRCint}$ and $K_{UPint}$ keys associated with the previously configured integrityProtAlgorithm, as specified in TS 33.501 [11].
1> request lower layers to verify the integrity protection of the RRCReestablishment message, using the previously configured algorithm and the $K_{RRCint}$ key;
1> if the integrity protection check of the RRCReestablishment message fails:
  2> perform the actions upon going to RRC_IDLE as specified in 5.3.11, with release cause 'RRC connection failure', upon which the procedure ends;
1> configure lower layers to resume integrity protection for SRB1 using the previously configured algorithm and the $K_{RRCint}$ key immediately, i.e., integrity protection shall be applied to all subsequent messages received and sent by the UE, including the message used to indicate the successful completion of the procedure;
1> configure lower layers to resume ciphering for SRB1 using the previously configured algorithm and, the $K_{RRCenc}$ key immediately, i.e., ciphering shall be applied to all subsequent messages received and sent by the UE, including the message used to indicate the successful completion of the procedure;
1> release the measurement gap configuration indicated by the measGapConfig, if configured;
1> release the MUSIM gap configuration indicated by the musim-GapConfig, if configured;
1> if ta-Report is configured with value enabled and the UE supports TA reporting;
  2> indicate TA report initiation to lower layers;
1> release the FR2 UL gap configuration indicated by the ul-GapFR2-Config, if configured;
1> set the content of RRCReestablishmentComplete message as follows:
  2> if the UE has logged measurements available for NR and if the RPLMN is included in plmn-IdentityList stored in VarLogMeasReport:
    3> include the logMeasAvailable in the RRCReestablishmentComplete message;
    3> if Bluetooth measurement results are included in the logged measurements the UE has available for NR:
      4> include the logMeasAvailableBT in the RRCReestablishmentComplete message;
    3> if WLAN measurement results are included in the logged measurements the UE has available for NR:
      4> include the logMeasAvailableWLAN in the RRCReestablishmentComplete message;
  2> if the sigLoggedMeasType in VarLogMeasReport is included:
    3> if T330 timer is running and the logged measurements configuration is for NR:
      4> set sigLogMeasConfigAvailable to true in the RRCReestablishmentComplete message;
    3> else:
      4> if the UE has logged measurements available for NR:
        5> set sigLogMeasConfigAvailable to false in the RRCReestablishmentComplete message;
  2> if the UE has connection establishment failure or connection resume failure information available in VarConnEstFailReport or VarConnEstFailReportList and if the RPLMN is equal to Minn-Identity stored in VarConnEstFailReport or VarConnEstFailReportList:
    3> include connEstFailInfoAvailable in the RRCReestablishmentComplete message;
  2> if the UE has radio link failure or handover failure information available in VarRLF-Report and if the RPLMN is included in plmn-IdentityList stored in VarRLF-Report; or
  2> if the UE has radio link failure or handover failure information available in VarRLF-Report of TS 36.331 and if the UE is capable of cross-RAT RLF reporting and if the RPLMN is included in plmn-IdentityList stored in VarRLF-Report of TS 36.331 [10]:
    3> include rlf-InfoAvailable in the RRCReestablishmentComplete message;
  2> if the UE has successful handover information available in VarSuccessHO-Report and if the RPLMN is included in plmn-IdentityList stored in VarSuccessHO-Report:
    3> include successHO-InfoAvailable in the RRCReestablishmentComplete message;
1> submit the RRCReestablishmentComplete message to lower layers for transmission;
1> the procedure ends.

5.3.7.6 T311 Expiry

Upon T311 expiry, the UE shall:
1> if the procedure was initiated due to radio link failure or handover failure:
  2> set the noSuitableCellFound in the VarRLF-Report to true;
1> perform the actions upon going to RRC_IDLE as specified in 5.3.11, with release cause 'RRC connection failure'.

5.3.7.7 T301 Expiry or Selected Cell/L2 U2N Relay UE No Longer Suitable

The UE shall:
1> if timer T301 expires; or
1> if the selected cell becomes no longer suitable according to the cell selection criteria as specified in TS 38.304 [20]; or
1> if the (re)selected L2 U2N Relay UE becomes unsuitable; or
1> upon reception of NotificationMessageSidelink indicating relayUE-HO or relayUE-CellReselection:
  2> perform the actions upon going to RRC_IDLE as specified in 5.3.11, with release cause 'RRC connection failure'.

[ . . . ]

NotificationMessageSidelink

The NotificationMessageSidelink message is used to send notification message from U2N Relay UE to the connected U2N Remote UE.

Signalling radio bearer: SL-SRB3

RLC-SAP: AM

Logical channel: SCCH

Direction: U2N Relay UE to U2N Remote UE

| NotificationMessageSidelink message |
| --- |

```
-- ASN1START
-- TAG-NOTIFICATIONMESSAGESIDELINK-START
NotificationMessageSidelink-r17 ::=        SEQUENCE {
    criticalExtensions                     CHOICE {
       notificationMessageSidelink-r17         NotificationMessageSidelink-r17-IEs,
       criticalExtensionsFuture                SEQUENCE { }
    }
}
NotificationMessageSidelink-r17-IEs ::=       SEQUENCE {
    indication Type-r17                       ENUMERATED {
                                              relayUE-Uu-RLF, relayUE-HO, relayUE-CellReselection,
                                              relayUE-Uu-RRC-Failure
    }                                             OPTIONAL, -- Need N
    lateNonCriticalExtension                  OCTET STRING              OPTIONAL,
    nonCriticalExtension                      SEQUENCE { }              OPTIONAL
}
-- TAG-NOTIFICATIONMESSAGESIDELINK -STOP
-- ASN1STOP
```

According to 3GPP TS 23.304, 5G ProSe Layer-2 UE-to-Network Relay is introduced to provide the relaying functionality to support connectivity to the network for 5G ProSe Remote UEs. When a remote UE initiates a service having traffic toward to network, the remote UE should establish a layer-2 link (or called, e.g., an unicast link, a PC5-RRC connection, a PC5-S connection, etc.) with a relay UE. Basically, the remote UE could send a Direct Communication Request message for requesting establishment of the unicast link to the relay UE with the remote UE's Layer 2 Identifier (L2ID) as Source L2ID and the relay UE's L2ID as Destination L2ID. The relay UE could learn the remote UE's L2ID by receiving the Direct Communication Request message with the remote UE's L2ID as Source L2ID.

According to 3GPP TS 38.331, the remote UE could initiate a Radio Resource Control (RRC) connection establishment procedure to establish a RRC connection with gNB via the relay UE. After that, the relay UE could occur Uu radio link failure with gNB. Even if the relay UE may recover the Uu RLF later, in order for reducing interruption time on the remote UE, the relay UE needs to inform the remote UE about Uu Radio Link Failure (RLF) via a NotificationMessageSidelink message. This situation will trigger the remote UE to initiate a RRC connection re-establishment procedure for the remote UE to find another suitable NR cell or relay UE as soon as possible for continuing traffic transfer with network.

Upon initiation of the RRC connection re-establishment procedure, the remote UE starts a timer T311 which is used for controlling time period of selecting a suitable NR cell or a suitable relay UE within this procedure. If the timer T311 expires, this means that the remote UE fails to find any suitable NR cell or relay UE, and the remote UE will perform the actions for going to RRC_IDLE (i.e. releasing the RRC connection with gNB). Within the RRC connection re-establishment procedure, if the remote UE determines to release the PC5-RRC connection with the relay UE, the remote UE performs cell selection and/or relay selection.

According to Section 5.3.7.3 of the Draft TS 38.331 V17.1.0 (2022-06) ("Draft_38331-h10_v2.docx"), if the remote UE selects a suitable NR cell, the remote UE stops the timer T311 and starts a timer T301. And then, the remote UE sends a RRCReestablishmentRequest message on the suitable NR cell. On the other hand, according to Section 5.3.7.3a of the Draft TS 38.331 V17.1.0 (2022-06) ("Draft_38331-h10_v2.docx"), if the remote UE selects a suitable L2 U2N Relay UE, the remote UE stops the timer T311 and starts the timer T301. And then, the remote UE sends a RRCReestablishmentRequest message to network (e.g. gNB) via the new selected relay UE. Regardless of which case the remote UE goes, if the timer T301 expires, this means the remote UE fails to send the RRCReestablishmentRequest message. To this end, the remote UE will perform the actions for going to RRC_IDLE (i.e. releasing the RRC connection with gNB).

Normally, if the remote UE selects a new suitable relay UE while the timer T311 is running, the UE performs the action, as specified in Section 5.3.7.3a of the Draft TS 38.331 V17.1.0 (2022-06) ("Draft_38331-h10_v2.docx"), in which the remote UE at least stops the timer T311, and starts the timer T301 and initiates transmission of RRCReestablishmentRequest message as specified in Section 5.3.7.4. Within the RRC connection re-establishment procedure, the remote UE may consider to maintain the current PC5-RRC connection with the relay UE and then stops the timer T311. If the remote UE follows the current procedural text in the Draft TS 38.331 V17.1.0 (2022-06) ("Draft_38331-h10_v2.docx"), the remote UE does not perform the action as specified in Section 5.3.7.3a of the Draft TS 38.331 V17.1.0 (2022-06) ("Draft_38331-h10_v2.docx"). This means the remote UE neither starts the timer T301 nor performs the transmission of RRCReestablishmentRequest message. This situation would cause deadlock on the RRC connection re-establishment procedure because the remote UE would not receive RRCReestablishment message from the network or would not enter RRC_IDLE due to no T301 running/expiry.

To address the deadlock issue, the remote UE could initiate/perform one or more actions in response to determining/considering not to release the PC5-RRC connection with the current relay UE during/within the RRC connection re-establishment procedure. The one or more actions could include at least one of following:

1. ensure having valid and up to date essential system information as specified in Section 5.2.2.2;
2. perform the Unified Access Control as specified in Section 5.3.14.4;
3. stop timer T311;
4. start timer T301;
5. apply the specified configuration of SL-RLC0 as specified in Section 9.1.1.4;
6. apply the SDAP configuration and PDCP configuration as specified in Section 9.1.1.2 for SRB0; and/or 7. initiate transmission of the RRCReestablishmentRequest message in accordance with Section Regarding above actions, the remote UE would not perform action 5 and 6 since the remote UE had already applied them on the relay UE when the remote UE connects to the relay UE. In other words, action 5 and 6 may be optionally initiated when the remote UE selects/connects a new relay UE.

Here are some potential text proposals:

Start of Text Proposal 5.3.7.2 Initiation
[ . . . ]
   Upon initiation of the procedure, the UE shall:
   [ . . . ]
   1> if the UE is acting as L2 U2N Remote UE:
      2> if the PC5-RRC connection with the U2N Relay UE is determined to be released:
         3> perform the PC5-RRC connection release as specified in 5.8.9.5;
         3> perform either cell selection in accordance with the cell selection process as specified in TS 38.304 [20], or relay selection as specified in clause 5.8.15.3, or both;
      2> else:
         3> maintain the PC5 RRC connection and perform the action as specified in clause 5.3.7.3a ~~stop T311 if running~~;
   NOTE 1: It is up to Remote UE implementation whether to release or keep the current PC5 unicast link.
   1> else:
      2> perform cell selection in accordance with the cell selection process as specified in TS 38.304 [20].
   NOTE 2: For L2 U2N Remote UE, if both a suitable cell and a suitable relay are available, the UE can select either one based on its implementation.

End of Text Proposal

Start of Text Proposal 5.3.7.2 Initiation
[ . . . ]
   Upon initiation of the procedure, the UE shall:
   [ . . . ]
   1> if the UE is acting as L2 U2N Remote UE:
      2> if the PC5-RRC connection with the U2N Relay UE is determined to be released:
         3> perform the PC5-RRC connection release as specified in 5.8.9.5;
         3> perform either cell selection in accordance with the cell selection process as specified in TS 38.304 [20], or relay selection as specified in clause 5.8.15.3, or both;
      2> else:
         3> maintain the PC5 RRC connection ~~and~~
         3> stop T311 if running;
         3> start timer T301;
         3> initiate transmission of the RRCReestablishmentRequest message in accordance with
   NOTE 1: It is up to Remote UE implementation whether to release or keep the current PC5 unicast link.
   1> else:
      2> perform cell selection in accordance with the cell selection process as specified in TS 38.304 [20].
   NOTE 2: For L2 U2N Remote UE, if both a suitable cell and a suitable relay are available, the UE can select either one based on its implementation.

Proposal

End of Text Proposal

Start of Text Proposal 5.3.7.2 Initiation
[ . . . ]
   Upon initiation of the procedure, the UE shall:
   [ . . . ]
   1> if the UE is acting as L2 U2N Remote UE:
      2> if the PC5-RRC connection with the U2N Relay UE is determined to be released:
         3> perform the PC5-RRC connection release as specified in 5.8.9.5;
         3> perform either cell selection in accordance with the cell selection process as specified in TS 38.304 [20], or relay selection as specified in clause 5.8.15.3, or both;
      2> else:
         3> maintain the PC5 RRC connection and consider the U2N Relay UE as a selected suitable L2 U2N Relay UE~~stop T311 if running~~ ;
   NOTE 1: It is up to Remote UE implementation whether to release or keep the current PC5 unicast link.
   1> else:
      2> perform cell selection in accordance with the cell selection process as specified in TS 38.304 [20].
   NOTE 2: For L2 U2N Remote UE, if both a suitable cell and a suitable relay are available, the UE can select either one based on its implementation.

End of Text Proposal

In the third text proposal, considering the U2N Relay UE as a selected suitable L2 U2N Relay implies that the UE will perform the actions as specified in Section 5.3.7.3a of 3GPP TS 38.331.

Figure 13:
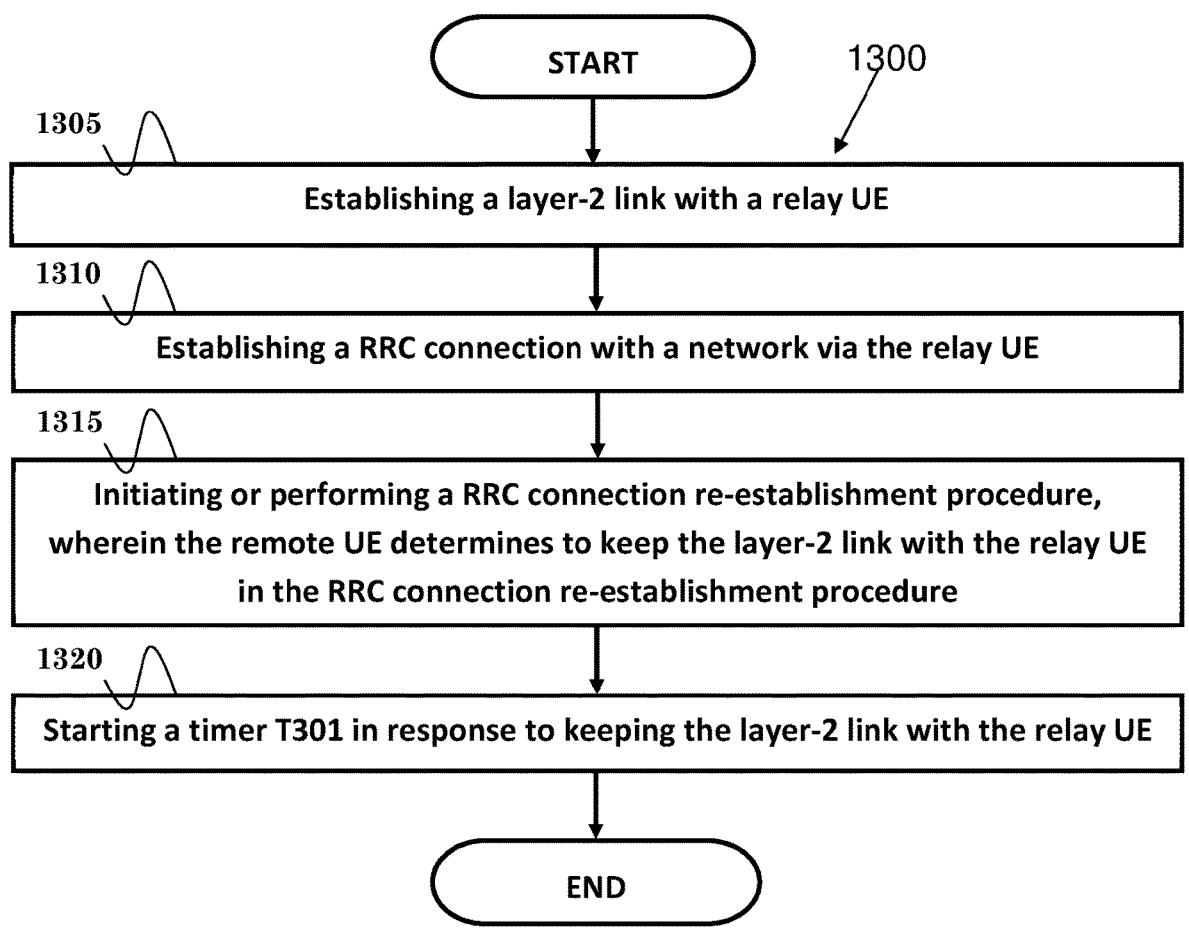
FIG. 13 is a flow chart according to one exemplary embodiment.

FIG. 13 is a flow chart 1300 from the perspective of a remote UE. In step 1305, the remote UE establishes a layer-2 link with a relay UE. In step 1310, the remote UE establishes a Radio Resource Control (RRC) connection with a network via the relay UE. In step 1315, the remote UE initiates or performs a RRC connection re-establishment procedure, wherein the remote UE determines to keep the layer-2 link with the relay UE in the RRC connection re-establishment procedure. In step 1320, the remote UE starts a timer T301 in response to keeping the layer-2 link with the relay UE.

In one embodiment, the remote UE could initiate a transmission of a RRCReestablishmentRequest message to the network via the relay UE in response to keeping the layer-2 link with the relay UE. The remote UE could start a timer T311 upon initiation of the RRC connection re-establishment procedure. The remote UE could stop the timer T311 in response to keeping the layer-2 link with the relay UE.

In one embodiment, the remote UE could stop the timer T301 in response to reception of a RRCReestablishment message corresponding to the RRCReestablishmentRequest message from the network via the relay UE. The network may include a base station or a gNB.

Referring back to FIGS. 3 and 4, in one exemplary embodiment of a method for a remote UE, the remote UE 300 includes a program code 312 stored in the memory 310.

The CPU 308 could execute program code 312 to enable the remote UE (i) to establish a layer-2 link with a relay UE, (ii) to establish a RRC connection with a network via the relay UE, (iii) to initiate or perform a RRC connection re-establishment procedure, wherein the remote UE determines to keep the layer-2 link with the relay UE in the RRC connection re-establishment procedure, and (iv) to start a timer T301 in response to keeping the layer-2 link with the relay UE. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a remote User Equipment (UE), comprising:
   establishing a layer-2 link between the remote UE and a relay UE;
   establishing a Radio Resource Control (RRC) connection between the remote UE and a network via the relay UE;
   initiating or performing a RRC connection re-establishment procedure, wherein the remote UE, within the RRC connection re-establishment procedure, determines to keep or release the layer-2 link with the relay UE with which the remote UE initially established the layer-2 link;
starting a timer T301 in response to the determination of keeping the layer-2 link with the relay UE; and
transmitting a request message for re-establishing the RRC connection to the network via the relay UE in response to the determination of keeping the layer-2 link with the relay UE.

2. The method of claim 1, wherein the request message for re-establishing the RRC connection is a RRCReestablishmentRequest message.

3. The method of claim 1, further comprising:
starting a timer T311 upon initiation of the RRC connection re-establishment procedure.

4. The method of claim 3, further comprising:
stopping the timer T311 in response to keeping the layer-2 link with the relay UE.

5. The method of claim 1, further comprising:
stopping the timer T301 in response to reception of a RRCReestablishment message corresponding to the RRCReestablishmentRequest message from the network via the relay UE.

6. The method of claim 1, wherein the network includes a base station or a gNB.

7. A remote User Equipment (UE), comprising:
a processor; and
a memory operatively coupled to the processor, wherein the processor is configured to execute a program code stored in the memory to:
establish a layer-2 link between the remote UE and a relay UE;
establish a Radio Resource Control (RRC) connection between the remote UE and a network via the relay UE;
initiate or perform a RRC connection re-establishment procedure, wherein the remote UE, within the RRC connection re-establishment procedure, determines to keep or release the layer-2 link with the relay UE with which the remote UE initially established the layer-2 link;
start a timer T301 in response to the determination of keeping the layer-2 link with the relay UE; and
transmit a request message for re-establishing the RRC connection to the network via the relay UE in response to the determination of keeping the layer-2 link with the relay UE.

8. The remote UE of claim 7, wherein the request message for re-establishing the RRC connection is a RRCReestablishmentRequest message.

9. The remote UE of claim 7, wherein the processor is further configured to execute a program code stored in the memory to:
start a timer T311 upon initiation of the RRC connection re-establishment procedure.

10. The remote UE of claim 9, wherein the processor is further configured to execute a program code stored in the memory to:
stop the timer T311 in response to keeping the layer-2 link with the relay UE.

11. The remote UE of claim 7, wherein the processor is further configured to execute a program code stored in the memory to:
stop the timer T301 in response to reception of a RRCReestablishment message corresponding to the RRCReestablishmentRequest message from the network via the relay UE.

12. The remote UE of claim 7, wherein the network includes a base station or a gNB.

* * * * *